(12) United States Patent
Favre et al.

(10) Patent No.: US 12,325,606 B2
(45) Date of Patent: Jun. 10, 2025

(54) TRANSFER MODULE FOR A CONVERTING MACHINE

(71) Applicant: BOBST MEX SA, Mex (CH)

(72) Inventors: Olivier Favre, Bussigny (CH); Raoul Michoud, Cossonay-Ville (CH); Jonas Duboux, Saubraz (CH); Olivier Muhlbauer, Penthalaz (CH); Nicolas Brizzi, Martigny (CH); Dimitri Favini, Le Mont-sur-Lausanne (CH); Pierre Malherbe, Chavornay (CH)

(73) Assignee: BOBST MEX SA, Mex (CH)

( * ) Notice: Subject to any disclaimer, the term of this patent is extended or adjusted under 35 U.S.C. 154(b) by 149 days.

(21) Appl. No.: 18/040,285

(22) PCT Filed: Jul. 21, 2021

(86) PCT No.: PCT/EP2021/070344
§ 371 (c)(1),
(2) Date: Feb. 2, 2023

(87) PCT Pub. No.: WO2022/028890
PCT Pub. Date: Feb. 10, 2022

(65) Prior Publication Data
US 2023/0264917 A1    Aug. 24, 2023

(30) Foreign Application Priority Data

Aug. 3, 2020 (EP) .................................... 20189085

(51) Int. Cl.
*B31B 50/04* (2017.01)
*B31B 50/00* (2017.01)
(Continued)

(52) U.S. Cl.
CPC ........... *B65H 29/18* (2013.01); *B31B 50/005* (2017.08); *B31B 50/042* (2017.08); *B31B 50/98* (2017.08);
(Continued)

(58) Field of Classification Search
CPC ..................... B65B 35/243; B65H 2404/2613
(Continued)

(56) References Cited

U.S. PATENT DOCUMENTS 3,224,761 A 12/1965 Meyer-Jagenberg
4,264,255 A 4/1981 Saro et al.
(Continued)

FOREIGN PATENT DOCUMENTS

DE 3007413 A1 9/1981
DE 19828821 A1 12/1999
(Continued)

*Primary Examiner* — Thanh K Truong
*Assistant Examiner* — Patrick B Fry
(74) *Attorney, Agent, or Firm* — Bookoff McAndrews, PLLC

(57) ABSTRACT

The present invention relates to a transfer module (26) for a folder-gluer machine (1), the transfer module comprising a lower conveyor (36) and an upper conveyor (38) adapted to receive a folding box (2) therebetween and to transport the folding box in a direction of transportation (D) towards a downstream-located loading surface (90) in a stacker module. The upper conveyor (36) of the transfer module extends further in the direction of transportation than the lower conveyor (38) and the lower conveyor comprises a first conveyor belt (38a) and second conveyor belt (38b), each having an inlet end (67a, 67b) and an outlet end (65a, 65b), and wherein the outlet ends are displaceable in the direction of transportation.

20 Claims, 16 Drawing Sheets

(51) Int. Cl.
*B31B 50/98* (2017.01)
*B65B 35/24* (2006.01)
*B65H 29/18* (2006.01)
*B31B 100/00* (2017.01)
*B31B 120/30* (2017.01)

(52) U.S. Cl.
CPC . *B31B 2100/0024* (2017.08); *B31B 2120/302* (2017.08); *B65H 2404/2613* (2013.01)

(58) Field of Classification Search
USPC .............. 53/251; 198/586, 588, 605, 626.3; 271/272
See application file for complete search history.

(56) References Cited

U.S. PATENT DOCUMENTS

| | | | |
|---|---|---|---|
| 4,558,859 A * | 12/1985 | Duke | B65H 31/18 271/215 |
| 5,493,104 A | 2/1996 | Wilson | |
| 5,720,593 A * | 2/1998 | Pleake | B65B 57/10 414/789.9 |
| 5,855,368 A * | 1/1999 | Middelberg | B65H 5/023 198/588 |
| 5,904,237 A | 5/1999 | Sander et al. | |
| 6,594,974 B2 * | 7/2003 | Theriault | B65H 33/12 53/251 |
| 8,471,175 B2 * | 6/2013 | Finn | B23K 26/0838 219/121.82 |
| 9,428,361 B2 * | 8/2016 | Steiner | B65H 29/16 |
| 9,771,227 B2 * | 9/2017 | Allen, Jr. | B65H 5/023 |
| 10,618,758 B2 * | 4/2020 | Meskar | B65H 29/6663 |
| 2003/0041570 A1 | 3/2003 | Theriault | |
| 2019/0300308 A1 * | 10/2019 | Meskar | B65H 7/00 |

FOREIGN PATENT DOCUMENTS

| | | |
|---|---|---|
| EP | 2657142 A1 | 10/2013 |
| EP | 3481756 B1 | 5/2019 |
| JP | S55101548 A | 8/1980 |
| JP | S55176252 U | 12/1980 |
| JP | 2011167858 A | 9/2011 |
| JP | 2011251760 A | 12/2011 |

* cited by examiner

TRANSFER MODULE FOR A CONVERTING MACHINE

CROSS-REFERENCE TO RELATED APPLICATION(S)

This application is a National Stage Application under 35 U.S.C. § 371 of International Application No. PCT/EP2021/070344, filed Jul. 21, 2021, which claims priority to European Application No. 20189085.2, filed on Aug. 3, 2020, the entireties of which are incorporated herein by reference.

FIELD OF THE INVENTION

The present invention relates to a converting machine for producing folding boxes from sheet-like blanks. In particular, the invention relates to a conditioning section for stacking and bundling folded boxes together.

BACKGROUND

Converting machines are used in the packaging industry for transforming sheet-like blanks such as cardboard or paperboard blanks into folding boxes. These machines are often referred to as folder-gluer machines and are configured to convert a blank into a folding box by successively folding and gluing the blank. The produced folding box is provided with a flat shape, and a plurality of boxes can be stacked and conditioned together in the form of bundles to facilitate transportation and storage.

However, when forming a calibrated stack of folding boxed in a folder-gluer machine, there are many movable mechanical parts in contact with the edges of the boxes. This may create an uneven stack and cause damage to the boxes which may compromise their functional or aesthetic characteristics.

Document U.S. Pat. No. 3,224,761 discloses a module for depositing sheets in a calibrated manner. The module comprises an upper conveyor extending over a stack holder and nozzles providing compressed air such that the sheets are adhered against the upper conveyor.

SUMMARY

In view of the above-mentioned problem, it is an object of the present invention to prevent damage to the folding boxes when conditioning bundles of stacked folding boxes.

This problem is solved by a transfer module according to claim 1. Other advantageous features of the present invention are defined in the dependent claims.

According to a first aspect of the present invention, there is provided a transfer module for a folder-gluer machine, the transfer module comprising a lower conveyor and an upper conveyor adapted to receive a folding box therebetween and to transport the folding box in a direction of transportation towards a downstream-located loading surface in a stacker module,
  wherein the upper conveyor of the transfer module extends further in the direction of transportation than the lower conveyor,
  and wherein the lower conveyor comprises a first conveyor belt and second conveyor belt, each having an inlet end and an outlet end, and wherein the outlet ends are displaceable in the direction of transportation.
The upper conveyor is configured to extend over the loading surface in the stacker module. The displaceable outlet ends of the lower conveyor are configured such that the distance between the outlet end of the lower conveyor and the loading surface in the stacker module can be changed.

The present invention is based on a realization that a confined and limited space for the folding box can be created by the position of the upper and lower conveyors. This prevents the folding box from undesired movement and misalignments and guides the folding boxes downward to form an aligned stack on the loading surface in the stacker module.

The outlet ends of the lower conveyor belts may be individually displaceable at different longitudinal positions in the direction of transportation.

In an advantageous embodiment, the upper conveyor comprises a first conveyor belt and a second conveyor belt, each provided with a distal inlet end and a distal outlet end, and wherein the distal outlet end of the first conveyor belt and the distal outlet end of the second conveyor belt are individually displaceable in the direction of transportation, such that their projection in the direction of transportation can be varied.

In such a way, the projection of the first conveyor belt and the second conveyor belt of the upper conveyor over the loading surface in the stacker module can be varied.

In an embodiment, the upper conveyor of the transfer module extends further in the direction of transportation than the lower conveyor, and wherein the upper conveyor extends over the loading surface in the stacker module.

In an embodiment, the upper conveyors extend are configured to extend over the loading surface by at least 50% of the length of the loading surface in the stacker module.

In an embodiment, the distal outlet end of the first upper conveyor belt and the distal outlet of the second upper conveyor belt can be positioned at different longitudinal positions in relation to each other. The first conveyor belt and the second conveyor belt may be arranged parallel to each other.

In an embodiment, each of the first and second upper conveyor belts are mounted on an upper frame portion having a fixed frame portion and a movable frame portion, wherein the movable frame portion comprises a first and a second distal outlet roller defining the distal outlet ends of the first and second upper conveyor belts.

In an embodiment, each of the first and second lower conveyor belts are mounted on a lower frame portion having a fixed frame portion and a movable frame portion, wherein the movable frame portion comprises a distal roller defining the distal outlet ends of the first and second lower conveyor belts.

In an embodiment, a first and second roller assembly are connected to the movable frame portion and configured to follow its movement.

In an embodiment, the first and second lower conveyor belts and the first and second upper conveyor belts are laterally movable such that a lateral distance between the conveyor belts can be modified.

In an embodiment, the first and second lower conveyors and the first and second upper conveyors belts are guided by displaceable compensation rollers located in the fixed frame portions, and wherein said rollers are configured to change the travel path of the conveyor belts and modify their contact length against the folding box.

In an embodiment, a support surface in the transfer module is located between the upper and lower conveyors and wherein said support surface is upwardly sloped in the direction of transportation at an angle ranging from 1° to 15°, preferably between 3° and 7°, and most preferably about 5°. This allows the folding boxes to move by the gravitational force caused by the slope such that the back trailing edges of the folding boxes are abutting against an ejector surface and an aligned pile can be formed.

According to a second aspect of the present invention, there is provided a transfer and stacking assembly for a folder-gluer machine, the assembly comprising a transfer module and a stacker module, wherein the stacker module comprises a loading surface and an ejector, and wherein the loading surface is upwardly sloped in the direction of transportation.

The support surface in the transfer module and the loading surface in the stacker module may have substantially the same inclination. In an embodiment, at least a portion of the ejector is positioned upstream of the distal outlet rollers of the first and second lower conveyor belts.

According to another aspect of the present disclosure, it relates to a stacker module for a folder-gluer machine, the stacker module being located downstream of a transfer module in a direction of transportation of the folder-gluer machine and configured to receive folding boxes from a conveyor in the transfer module, wherein the stacker module comprises a loading surface configured to receive a plurality of folding boxes in order to form a stack and to descend vertically as the number of folding boxes on the loading surface increases, and a linearly movable ejector configured to eject the stack from the loading surface, and wherein the stacker further comprises a front abutment guide configured to move between an abutment position in which the front abutment guide is positioned in front of a front leading edge of the folding boxes as they are deposited onto the loading surface, and a clearing position in which the front abutment guide is positioned distant from the stack such that the ejector can evacuate the stack from the loading surface.

This is based on a realization that a confined and limited space for the folding box can be created by the front abutment guide. This prevents the folding box from undesired movement and misalignments and guides the folding boxes down to form an aligned stack on the loading surface in the stacker module.

The loading surface may be configured to descend stepwise each time a batch of boxes is supplied. Alternatively, the loading surface can be configured to descend continuously when the boxes are provided to the loading surface in a continuous supply. In an embodiment, the loading surface can be modified for stepwise or continuous descent.

In an embodiment, the front abutment guide comprises a first abutment plate and a second abutment plate arranged side-by-side. The first and second abutment plates may be laterally displaceable in relation to each other. In an embodiment, the first and second abutment plates are longitudinally displaceable in relation to each other and in the direction of transportation.

In an embodiment, the ejector comprises a first pusher and a second pusher arranged laterally of each other, and wherein each pusher is linearly displaceable in the direction of transportation and configured to move in unison between a retracted position and an extended position.

The first and the second pushers may be laterally and longitudinally displaceable in relation to each other, such that their retracted position and extended position are different.

In an embodiment, the stacker module further comprises an upper guide, configured to move between a clearing position, vertically distant from the upper surface of the stack, and a guiding position, in which the upper guide is located closer to the upper surface of the stack, and wherein the upper guide is in the guiding position when the ejector is moved from the retracted position.

The upper guide can be synchronized to be in the guiding position during an evacuation descent of the completed stack on the loading surface and configured to follow the downward movement of the loading surface.

The upper guide can thus be positioned adjacent to the top of the stack before the ejector evacuates the stack from the loading surface. A faster downward movement of the stack is possible, as the sheets stay stacked together during the downward movement. This in turn enables a higher overall production speed and prevents the pile from being disturbed. This is advantageous for boxes which have a low density and high air resistance and would otherwise risk "flying" as the loading surface descends.

In an embodiment, the upper guide comprises a first and second elongated guide members extending in the direction of transportation. In an embodiment, the lateral distance between the first guide member and second guide member can be modified.

The ejector can be arranged laterally of the first and second lower conveyor belts and is preferably arranged laterally of the first and second guide members.

In an embodiment, the guiding position of the upper guide may be modified to correspond to the desired height of the stack. The upper guide can be movable at the same speed as the loading surface. Optionally, the upper guide can be deactivated and stationary arranged in the clearing position.

The upper guide calibrates the stack of folding boxes. Hence, the upper guide can be set to descend in order to compress the stack before the stack is transferred into the banding module. This provides a consistent height of the stack such that the bundles of boxes exiting the banding module have the same height. The term "calibrated" means that the boxes are aligned.

In an embodiment, the front stopper guide remains stationary as the loading surface is descending. Alternatively, the front stopper is moved vertically upwardly when the loading surface is descending. As the stack of sheets moves downwards, only the top sheets in the stack need to be limited in their forwards movement. Hence, the front stopper may only be located in the position where it is needed. This reduces the vertical extension length of the front stopper and the movement needed for moving the front stopper in the clearing position such that the stack can be evacuated.

The ejector may be connected to an actuator and configured to move at a first speed when the stack is present in the stacking module and at a second speed when the stack is present in a banding station, and wherein the first speed is greater than the second speed.

The distance defined for the first speed can be modified depending on the longitudinal length of the folding box in the direction of transportation.

According to a second aspect of the present disclosure, it relates to a transfer and stacking assembly for a folder-gluer machine, the assembly comprising the stacker module according to any one of the preceding claims and a transfer module, wherein the transfer module comprises a lower conveyor and an upper conveyor adapted to receive a folded box therebetween and to transport the folding box in a direction of transportation towards a downstream-located loading surface in a stacker module, and wherein the upper conveyor and the lower conveyor comprises a first conveyor belt and a second conveyor belt, each provided with a distal inlet end and a distal outlet end, and wherein the distal outlet end of the first conveyor belt and the distal end of the second conveyor belt are individually displaceable in the direction of transportation, such that their extension over the loading surface in the stacker can be varied.

According to a third aspect of the present disclosure, it relates to a method of calibrating a stack of folding boxes in a transfer and stacking assembly according to the preceding claim, the method comprising the steps of:

In the transfer module, aligning a lower conveyor with a rear trailing edge of the folding box, In the transfer module, aligning an upper conveyor with the front leading edge of the folding box, In the stacker module, moving a front abutment guide into a guiding position, in which an upper guide is positioned at a first distance from the upper surface of the stack, Transporting the folding box between the upper and lower conveyors towards the loading surface in the stacker module, Descending the loading surface in the stacker module, Descending the loading surface to perform an evacuation descent when the stack is completed and the loading surface is at a final loading height, whereby the loading surface is descended to an evacuation position Moving the front abutment guide into a clearing position, vertically distant from the upper surface of the stack and further away from the upper surface of the stack than in the guiding position, and Moving the stack from the loading surface.

In an embodiment, the method may further comprise the step of descending an upper guide to be positioned against a top surface of the stack during the evacuation descent, during which the loading surface is moved from a final loading height to the evacuation position.

BRIEF DESCRIPTION OF THE DRAWINGS

Further advantages and features will become apparent from the following description of exemplary embodiments of the present invention and from the appended figures, in which like features are denoted with the same reference numbers and in which:

FIG. 1b shows a schematic view of a conditioning section in the folder-gluer machine of FIG. 1a;

FIGS. 2a to 2d illustrate exemplary types of blanks and folding boxes produced in the folder-gluer machine of FIG. 1a;

DETAILED DESCRIPTION

Figure 1A:
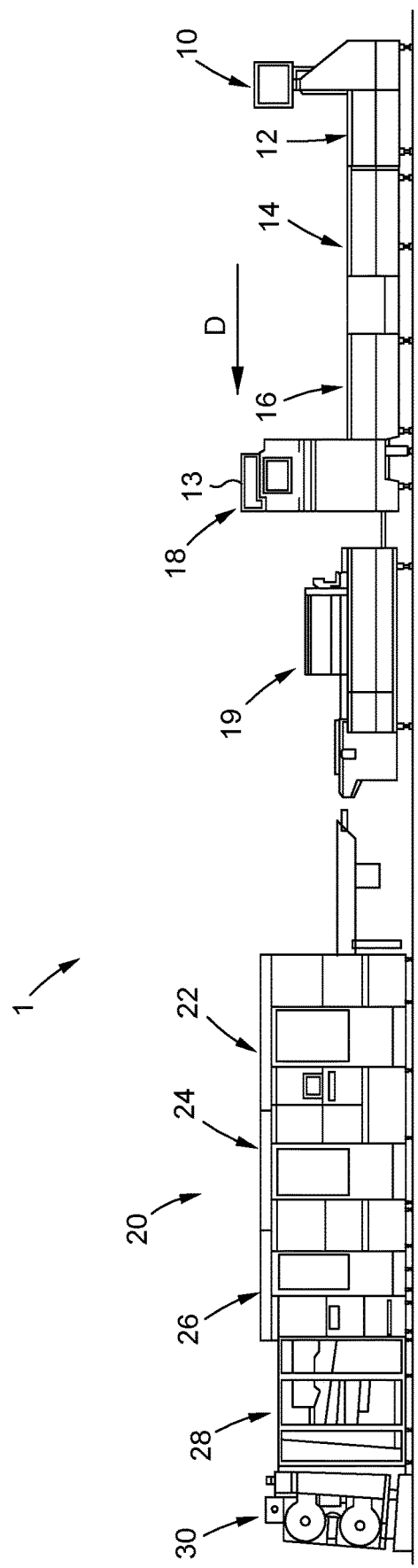
FIG. 1a shows a schematic view of a folder-gluer machine according to an embodiment the present invention.
Figure 2B:
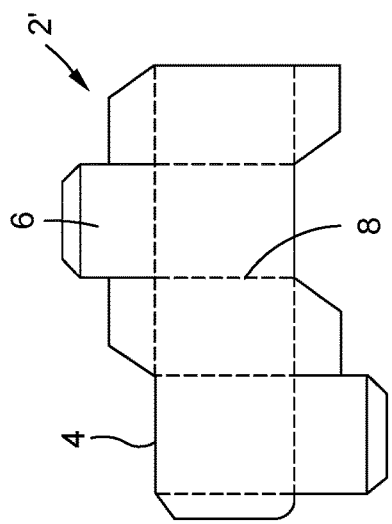
Figure 2D:
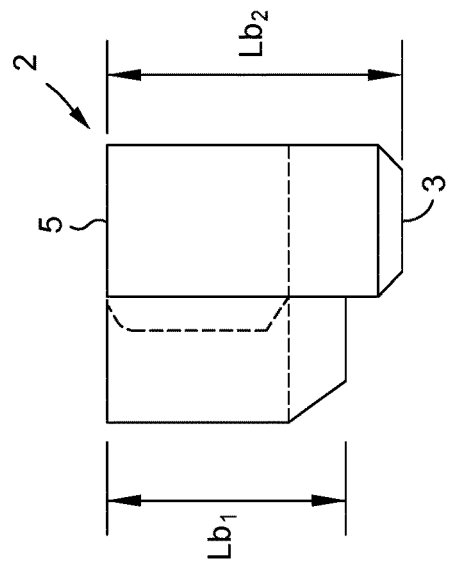
Figure 2A:
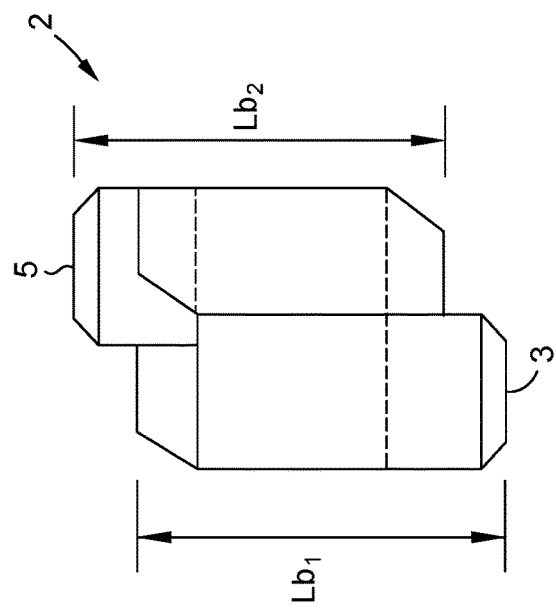
Figure 2C:
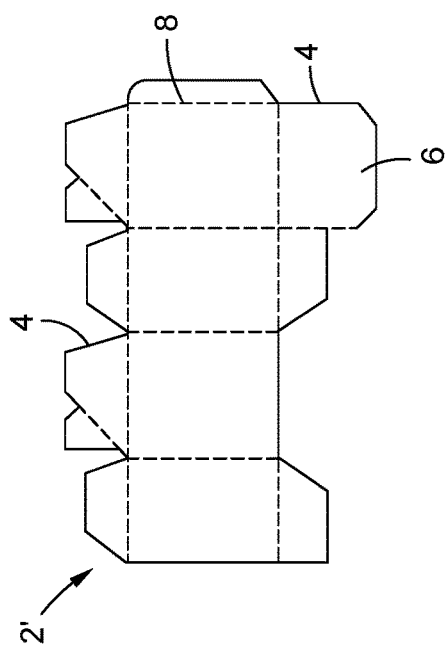

Referring to the figures and in particular to FIG. 1a which illustrates a converting machine in the form of a folder-gluer machine 1. The folder-gluer machine folds and glues blanks 2' as illustrated in FIGS. 2b and 2c to form folding boxes 2 as the ones illustrated in FIGS. 2a and 2d. The blanks 2' are provided with a peripheral edge 4 defining shape of flaps 6 and is provided with crease-lines 8, which enable the folding of the intermediate blank 2' along pre-defined lines.

Such a blank 2' is typically produced in another converting machine, such as a flat-bed die cutter, or a rotary die cutting machine. Those machines receive a flat and typically rectangular sheet substrate of cardboard or paperboard and converts it into a blank 2'.

Figure 1B:
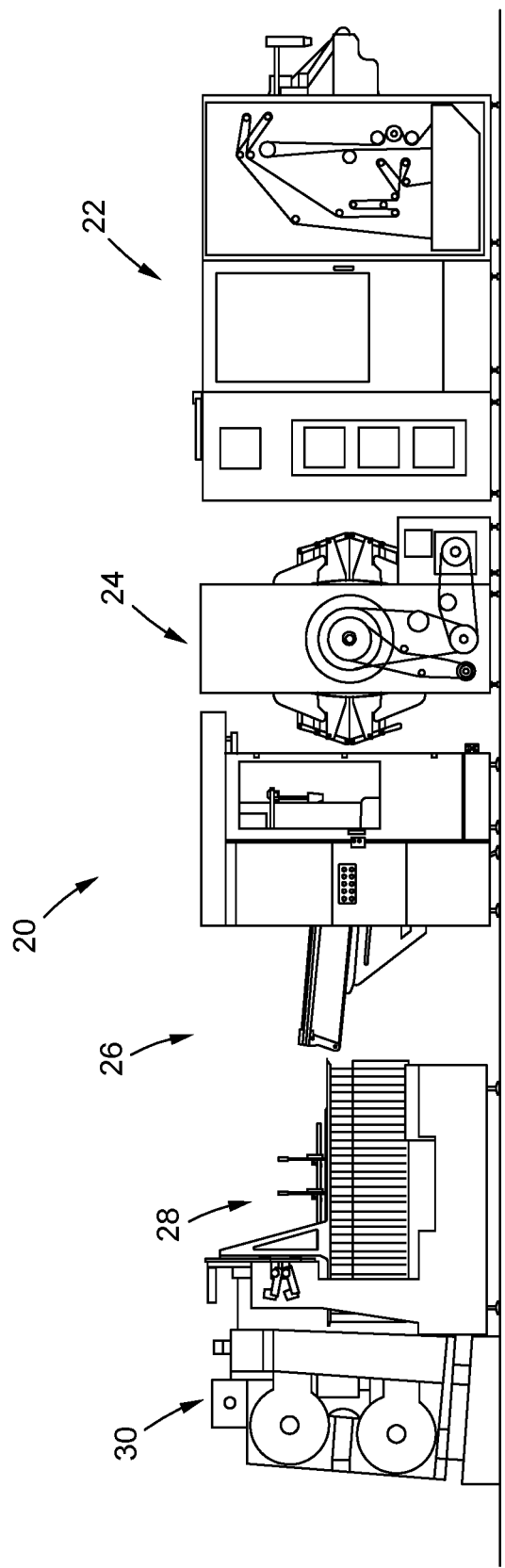

Referring back to FIG. 1a, the present folder-gluer machine 1 comprises a series of different workstations including, from an inlet to an outlet: a feeder module 10, a fold pre-breaking module 12, a gluing module 14, a folding module 16, a transfer module 18 and a delivery station or collecting table 19. After the folding and gluing modules of the converting machine, a conditioning section 20 can be provided in order to count and separate the flux of folding boxes 2 and to arrange them together in banded stacks. As illustrated in FIG. 1b, such a conditioning section 20 of the folder gluer 1 comprises a counter and separator unit 22, optionally a shingle inverter 24, a transfer module 26 arranged after the shingle inverter 24, a stacker module 28 configured to arrange the folding boxes in stacks, and a banding module 30.

The folder-gluer machine 1 further comprises a control system, which may include a main centralized control system and separate peripheral control systems. For instance, the conditioning section 20 may comprise a separate peripheral control unit 43. The combination of a centralized control system and peripheral control systems allow specific modules to retrieve and process some data locally, while a central control unit 13 of the centralized control system can be dedicated to controlling the overall operation of the folder-gluer machine 1.

The counter and separator unit 22 is configured to count and condition the stream of folding boxes into separated batches with a predefined quantity. The separated batches can then be provided with a surrounding band and bundled together in the downstream-located banding module 30.

Figure 14:
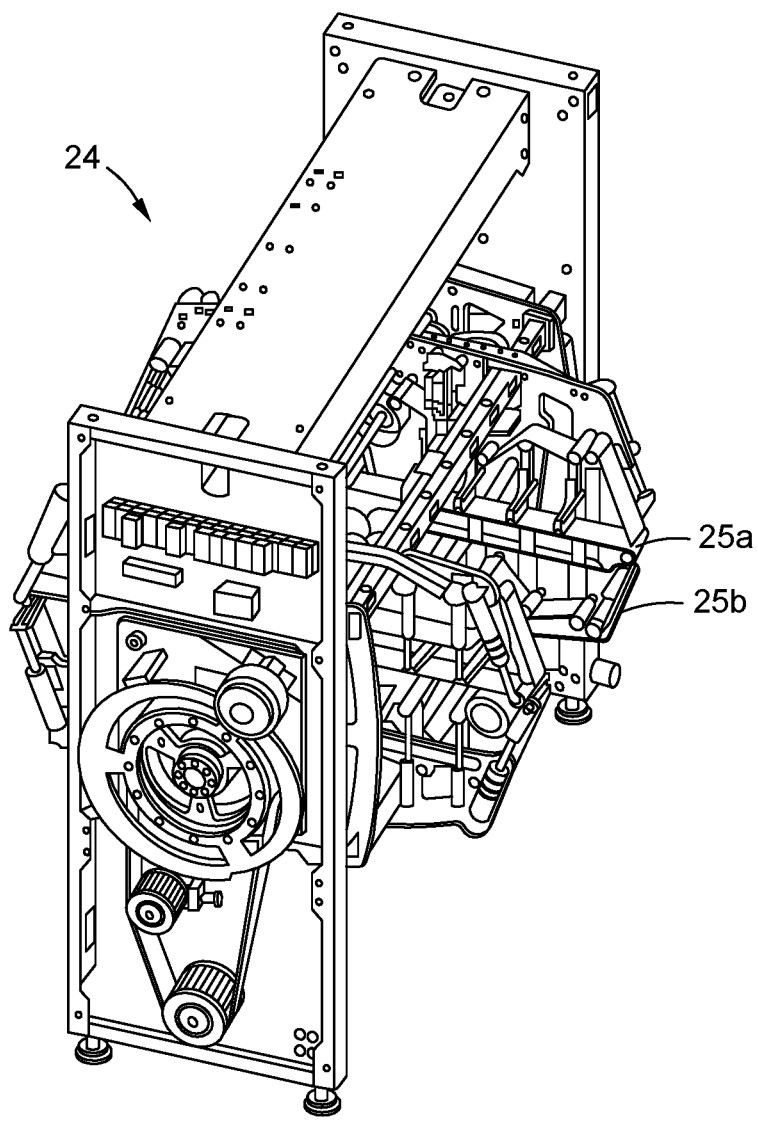
FIG. 14 is a schematic perspective view of a shingle inverter.

A shingle inverter 24 can be provided downstream of the counter and separator unit 22. The shingle inverter 24 is configured to turn every second batch of boxes around 180°, while letting a following batch pass straight through. Such a shingle inverter is described in the patent EP3481756B1 and is schematically illustrated in FIG. 14.

Turning batches of boxes around 180° makes it possible to even out the height of the stack and make it better calibrated such that the stack is substantially vertical. This is advantageous for some types of folding boxes 2 with a non-uniform thickness due to the shape of the folds. A non-uniform thickness often occurs when the folds result in superposing several sheet thicknesses on top of each other. As illustrated in FIG. 14, the shingle inverter 24 comprises an upper belt conveyor 25a and a lower belt conveyor 25b and is rotatable around an axis A such that a batch of folding boxes 2 can be received between the upper and lower conveyors 25a, 25b and turned around 180° as the shingle inverter rotates.

Figure 4:
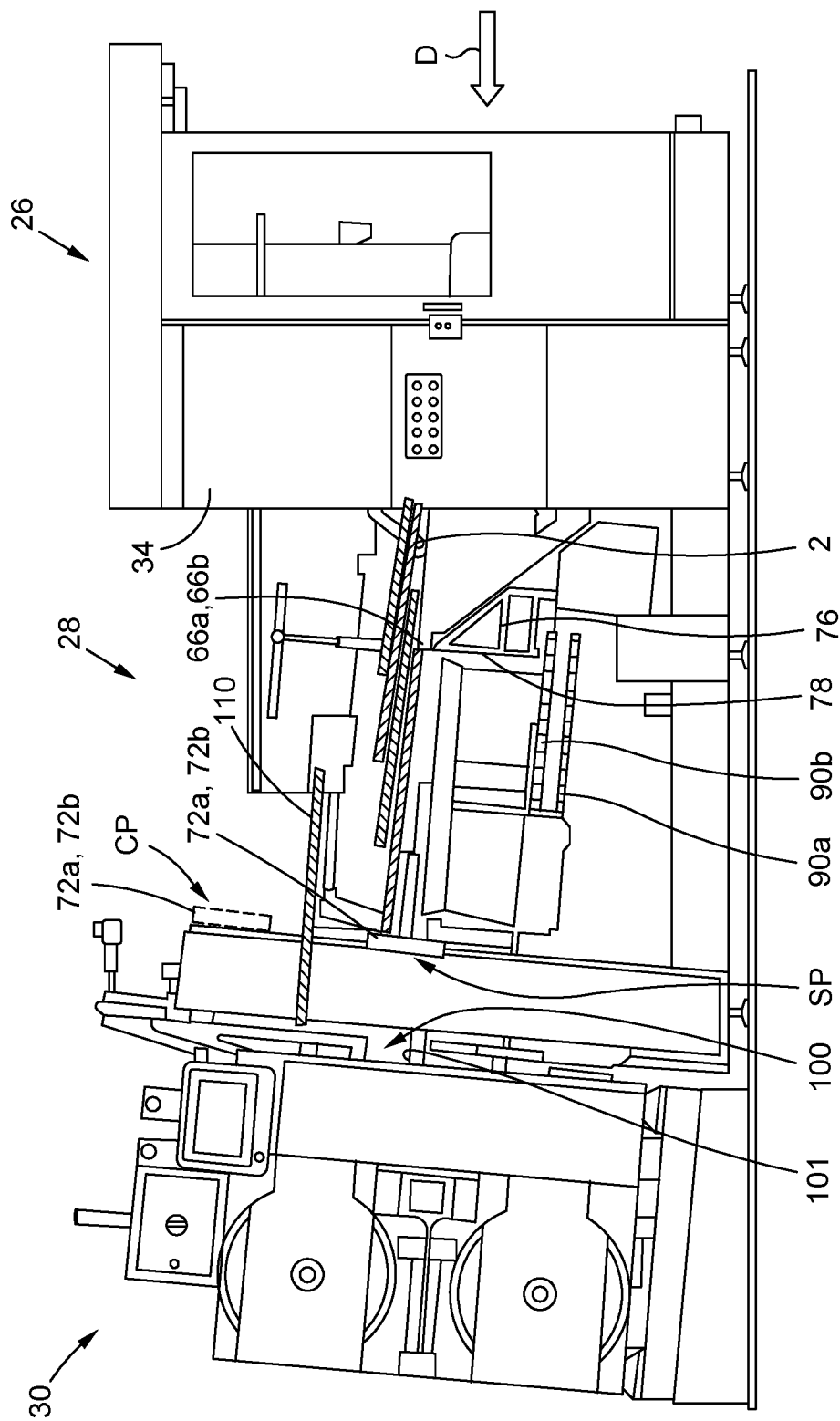
FIG. 4 is a schematic view of a conditioning section according to the present invention when receiving a flux of folding boxes.
Figure 5:
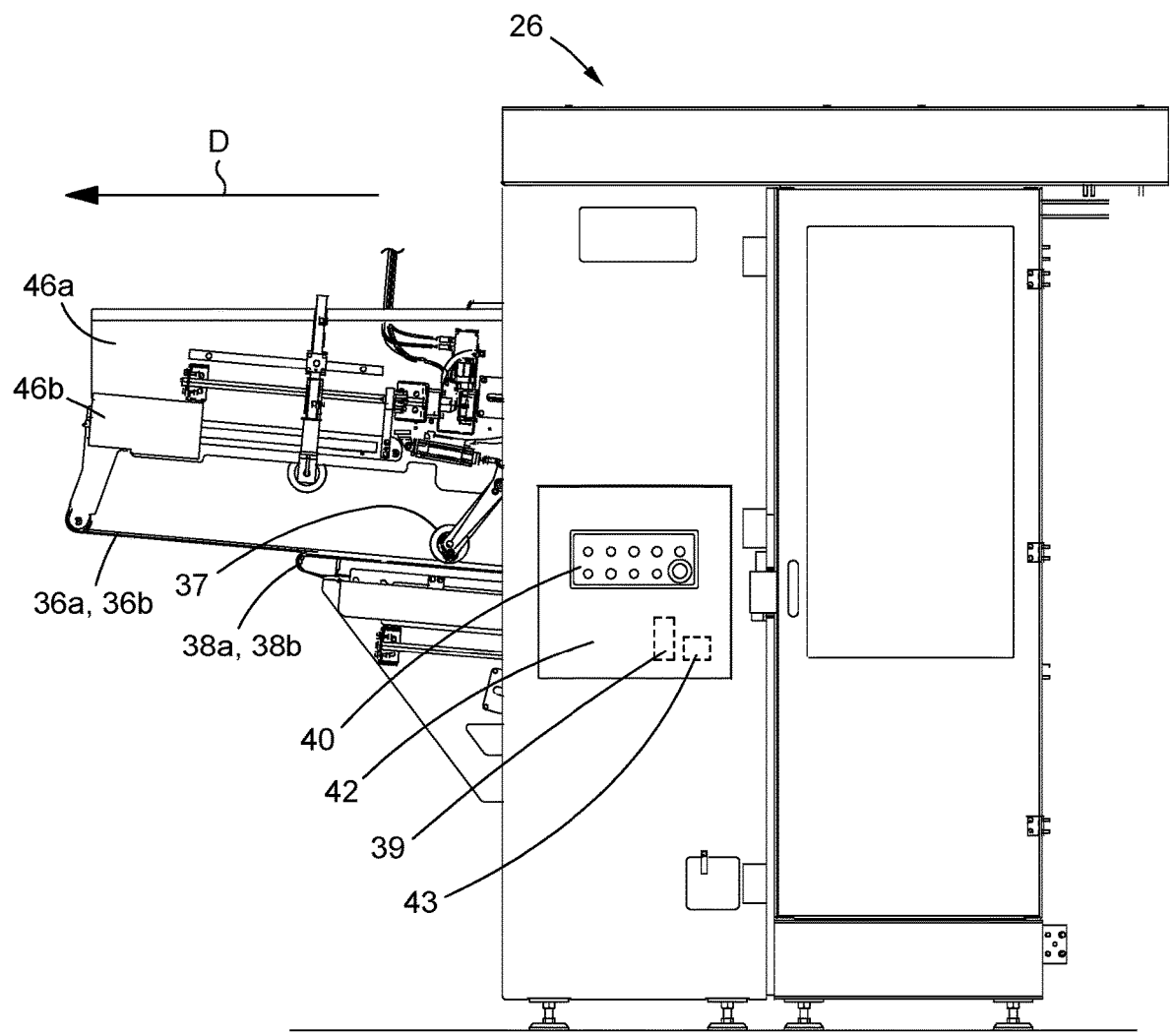
FIG. 5 shows a schematic view of a transfer module according to an embodiment of the present invention.
Figure 6:
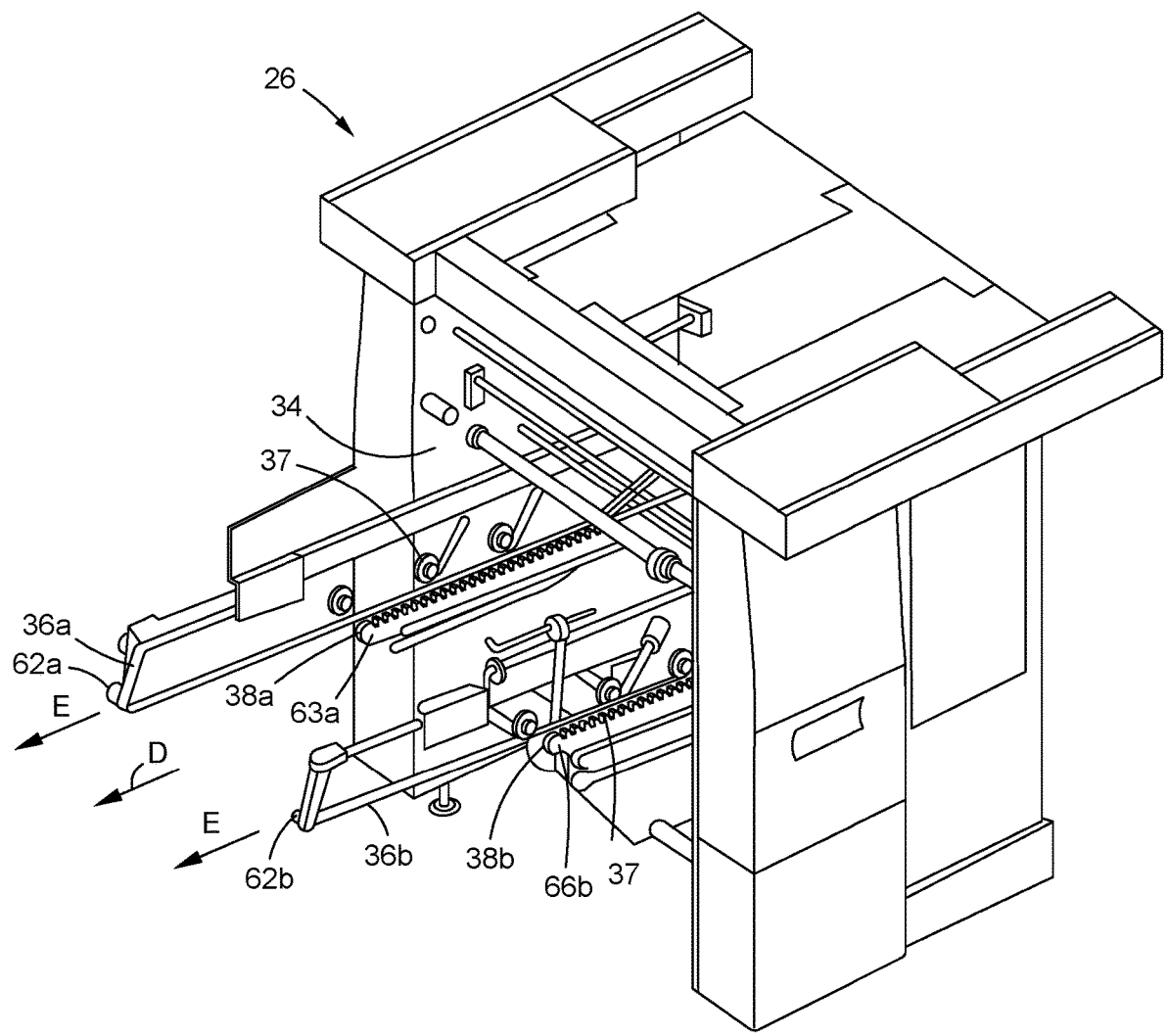
FIG. 6 is a schematic perspective view of a transfer module according to the present invention.

As best seen in FIG. 4, the folding boxes 2 from the shingle inverter 24 or directly from the counter-separator module 22 are further transported downstream to a transfer module 26, a stacker module 28 and a banding module 30. The transfer module 26 conveys the batches of folding boxes 2 and positions them into the downstream-located stacker 28 where they form a stack. The stacker module 28 collects the boxes 2 such that they form a stack of aligned and superposed boxes, which is then subsequently introduced into the banding module 30.

The details of a transfer module 26 according to an embodiment of the present invention will now be further described with reference to FIGS. 3 to 7. A seen in the figures, the transfer module 26 comprises an external housing and a structural frame 34, onto which an upper conveyor 36 and a lower conveyor 38 are mounted. The folding boxes 2 are received from an upstream-located module, such as a shingle inverter 24 or directly from a counter-separator module 22. The upper and lower conveyors 36, 38 are configured to convey a flux of folding boxes 2 in-between them and position the folding boxes 2 into the downstream-located stacker module 26. Hence, a support surface S is defined between the upper and lower conveyors 36, 38.

The transfer module 26 may further comprise a control interface 40 and a display 42. A peripheral control unit 43 may be arranged in proximity with and can be operatively connected to the control interface 40, such that an operator can monitor and change settings related to the transfer module 26. Alternatively, the peripheral control unit 43 may be located in the counter separator module 22 and operatively connected to the transfer module 26.

The upper and lower conveyors 36, 38 are provided with a lengthwise extension E coinciding with the longitudinal direction D of the folder-gluer machine 1. The longitudinal direction D in the folder-gluer machine 1 can be defined as the direction of transportation D of the blank 2' or folding box 2 through the folder-gluer machine 1.

In the illustrated embodiment, the upper conveyor 36 comprises a first upper conveyor belt 36a and a second upper conveyor belt 36b arranged in a pair. Similarly, the lower conveyor 38 comprises a first lower conveyor belt 38a and a second lower conveyor belt 38b arranged in a pair. The conveyor belts 36, 38 are in the form of endless belts and are guided by rollers 37 mounted on an upper frame component 46 and lower frame component 45 such that their position is maintained. The upper conveyor belts 36a, 36b are connected to a drive mechanism 48 comprising a drive roller 50 and a motor (not illustrated) which drives the belts in motion. Similarly, the lower conveyor belts 38a, 38b are further connected to a drive mechanism 41 comprising a drive roller 82. To this effect, the conveyor belts 36a, 36b; 38a, 38b can be provided with a contact side and traction side, where the traction side can be dented in order to engage with a corresponding dented drive roller 50.

The pairs of upper conveyor belts 36a, 36b each have an extension between an inlet end 56 and an outlet end 58 in the transfer module 26. The inlet end 56 is defined by inlet rollers 60a, 60b and the outlet end is defined by outlet rollers 62a, 62b. These ends 56, 58 define the total longitudinal contact length of the upper conveyor belts 36a, 36b which is in contact with the folding boxes 2.

Hence, the first and second upper conveyor belts 36a, 36b may comprise a first and second inlet ends 60a, 60b and a first and second outlet ends 62a, 62b. Similarly, the first and second lower conveyor belts 38a, 38b comprise a first and second inlet ends 67a, 67b and a first and second outlet ends 65a, 65b. The inlet ends 60a, 60b; 67a, 67b and the outlet ends 62a, 62b; 65a, 65b may be defined by rollers.

The first and second upper conveyor belts 36a, 36b may comprise a pair of movable inlet rollers 60a, 60b, configured to move between a receiving position R and a transport position T. The inlet rollers 60a, 60b can be attached to an elongated frame 63 which is received in a cooperating slide rail 64 in the upper frame 46 of the transfer module 26. The vertical movement of the first and second inlet rollers 60a, 60b of the upper conveyor belts 36a, 36b can be determined by an upstream-located sensor 61.

Figure 7:
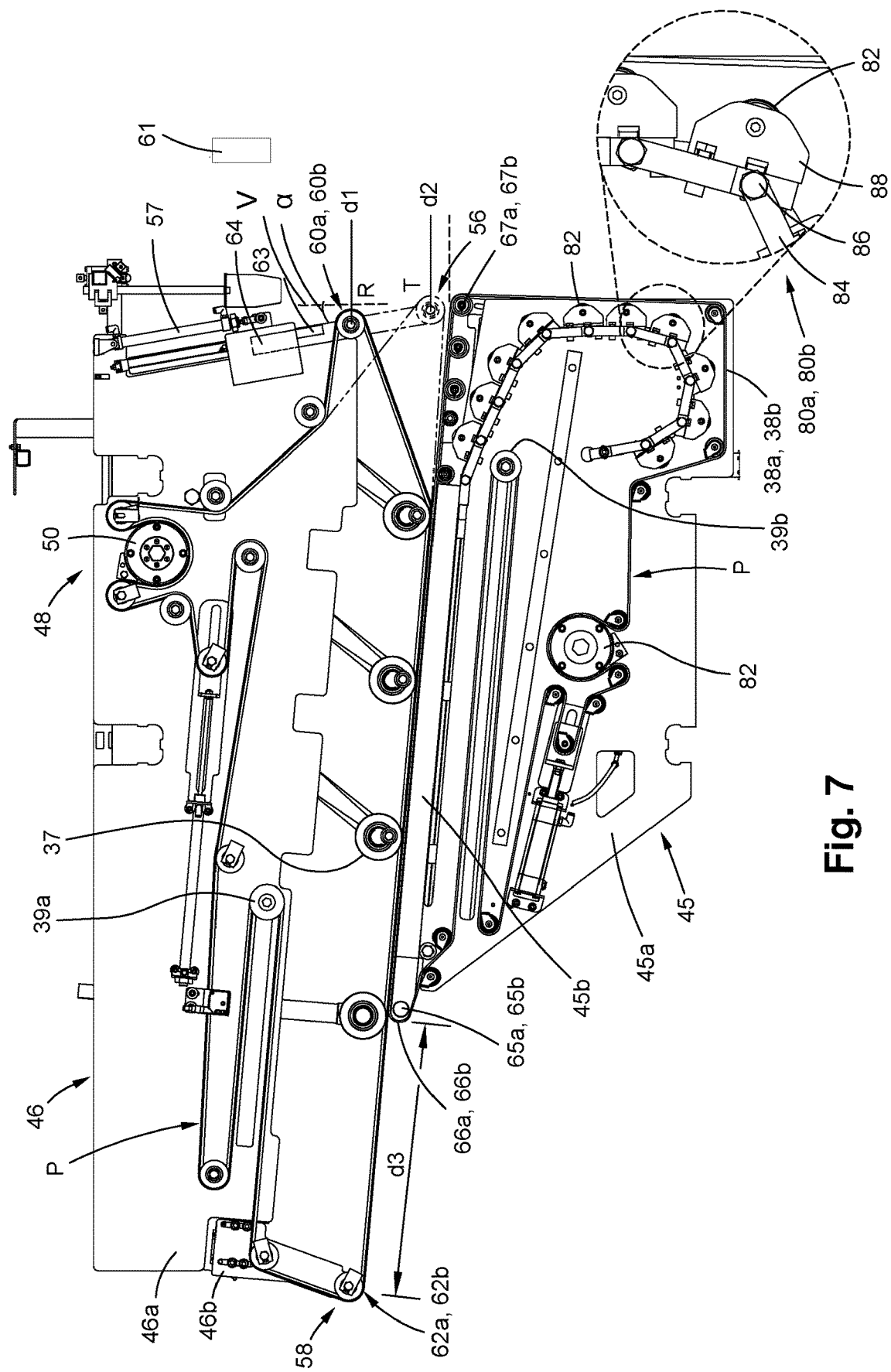
FIG. 7 is a schematic cross-sectional view of the transfer module of FIG. 5.

As illustrated in FIG. 7, in the receiving position R, the movable first 60a and second inlet rollers 60b of the upper conveyor belts 36a, 36b are positioned distant to the lower conveyor belts 38a, 38b at a first distance d1 from the lower conveyor belts 38a, 38b. This creates a funnel-shaped inlet between the upper conveyor belts 36a, 36b and the lower conveyor belts 38a, 38b such that a batch of folding boxes is guided in-between the upper and lower conveyor belts 36a, 36b; 38a, 38b. In the transport position T (as illustrated by the dashed roller) the movable distal inlet rollers 60a, 60b of the upper conveyor belts 36a, 36b are positioned at a second distance d2 from the lower conveyor belts 38a, 38b. In the second position, the movable distal inlet rollers 60a, 60b are positioned closer to the lower conveyor belts 38a, 38b. such that the folding boxes 2 are pinched between the upper and lower conveyors 36,38. Hence, the second distance d2 is smaller than the first distance d1.

The vertical movement of the first and second distal inlet rollers 60a, 60b of the upper conveyor belts 36a, 36b is coordinated with the register control of the folder-gluer 1 and with the position of the batches. The control unit 43 of the conditioning section 20 or a control unit of the counter-separator module 22 can be configured to determine the time of arrival of the batch of folding boxes to the inlet 56 of the transfer module 26 and activate an actuator 57 to displace the distal inlet rollers 60a, 60b accordingly.

At the outlet end 58 of the transfer module 26, distal ends 62a, 62b of the first and second upper conveyor belts 36a, 36b extend further in the longitudinal direction D than the distal outlet ends 66a, 66b of the first and second lower conveyors 38a, 38b. Preferably, a projection length, i.e. a distance d3 between distal outlet ends of the upper conveyor 62a, 62b and the distal outlet ends 66a, 66b of the lower conveyor belts 38a, 38b may be varied. Advantageously this distance d3 corresponds to the longitudinal length Lb1, Lb2 (see FIGS. 2a to 2d) of the produced folding box 2 in the longitudinal direction D. This allows for an adjustment in respect to different longitudinal lengths Lb1, Lb2 of folding boxes 2. The distal outlet ends 62*a*, 62*b*; 66*a*, 66*b* can be movable while the distal inlet ends 60*a*, 60*b*; 67*a*, 67*b* may remain at a fixed longitudinal position during the transportation of the batch of folding boxes 2.

The distal outlet ends 62*a*, 62*b* of the upper conveyor belts 36*a*, 36*b* are preferably provided with a projection length d3 such that they are in close proximity with a front abutment guide 70 of the stacker module 28. The front abutment guide 70 comprises at least one abutment surface 72*a*, 72*b*, preferably two abutment surfaces 72*a*, 72*b*. The first 72*a* and a second front abutment surfaces 72*b* can be in the form of a first abutment plate 72*a* and a second abutment plate 72*b*. The term "close proximity" can be defined as a projection distance d3 corresponding to more than 50% of the longitudinal length of the folding box 2, such as for instance 75 or 90%. A small distance between the abutment surfaces 72*a*, 72*b* and the upper conveyor belts 36*a*, 36*b* is preferable as this will ensure a maximum guidance of the folding box 2, while preventing that the upper conveyor belts 36*a*, 36*b* touch the abutment surfaces 72*a*, 72*b*. This enables the upper conveyor belts 36*a*, 36*b* to create a closed space such that the folding boxes 2 are contained underneath the upper conveyor belts 36*a*, 36*b*.

As illustrated in FIGS. 2*a* to 2*d*, 12*a* and 12*b*, some folding boxes 2 do not have a straight leading front edge 3 or a straight trailing edge 5. This is true for some types of boxes like straight-line boxes or crash-lock bottom boxes. The longitudinal projection d3 length of the first upper conveyor belt 36*a* and the second upper conveyor belt 36*b* may be different from each other. The front abutment guide 70 may thus comprise corresponding first 72*a* and a second front abutment surfaces 72*b* which are also be movable in the longitudinal direction D in order to ensure that the first 72*a* and a second front abutment surfaces 72*b* are in close proximity with the distal outlet ends 62*a*, 62*b* of the first and second upper conveyor belts 36*a*, 36*b*.

Figure 3:
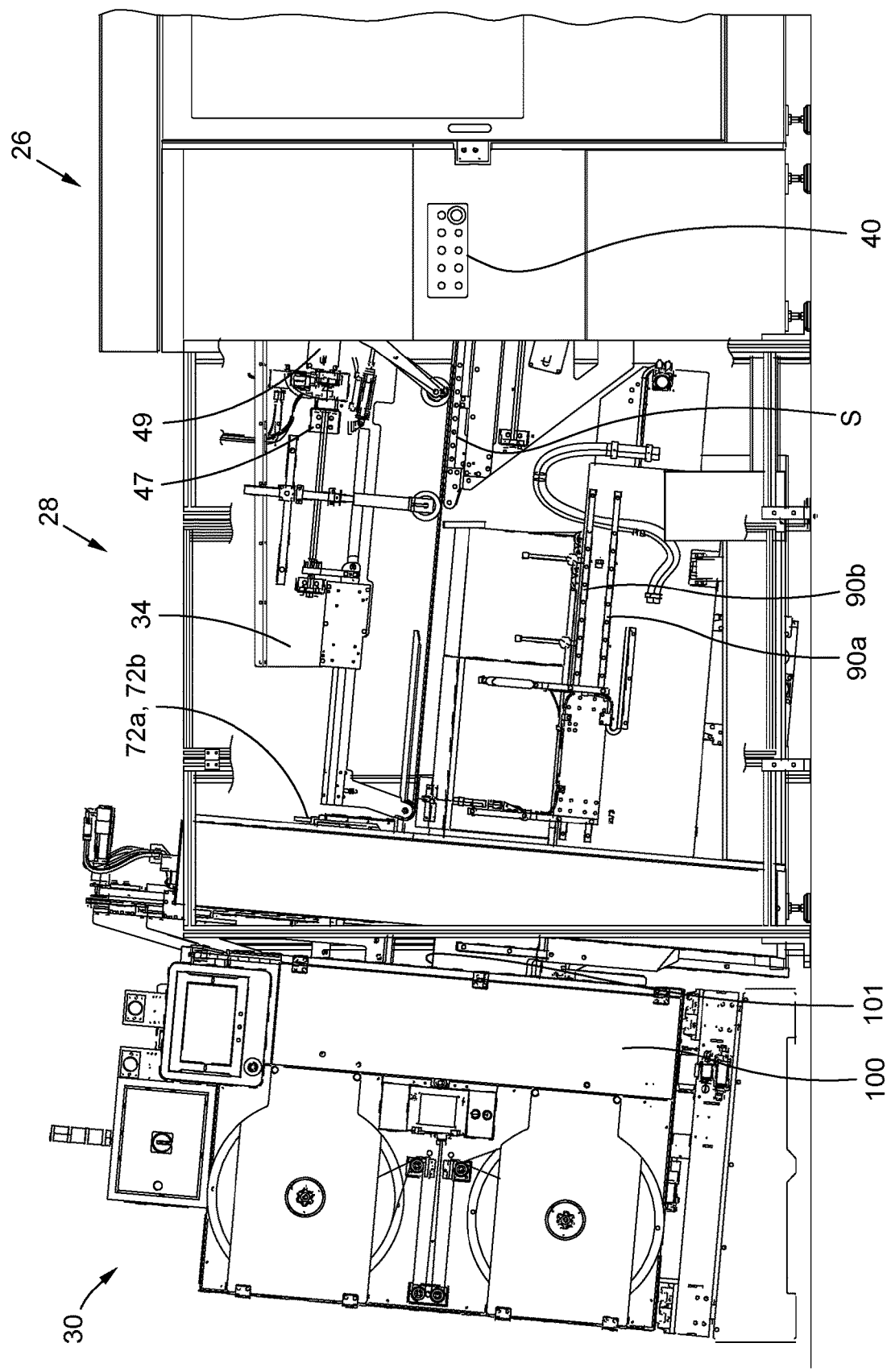
FIG. 3 is a schematic view of a conditioning section according to an embodiment of the present invention, and comprising a transfer module, a stacker module and a banding module.

As best seen in FIGS. 3 and 7, the first and second upper conveyor belts 36*a*, 36*b* are received in an upper frame assembly 46 comprising a fixed frame component 46*a* and a movable frame component 46*b*. The movable frame component 46*b* and the fixed frame component 46*a* are movably connected to each other. Advantageously, a slide rail connection may be provided between the fixed frame 46*a* component and movable frame 46*b* component such that the movable frame component 46*b* onto which the conveyor belts 36*a*, 36*b* are mounted, can slidably move in the direction of transportation D. This enables a modification of the projection length d3 of the upper conveyor belts 36*a*, 36*b*. This further results in that the distal outlet ends 62*a*, 62*b* of the first and second upper conveyor belts 36*a*, 36*b* are movably arranged in the direction of transportation D.

As best seen in FIG. 3, the movable frame component 46*a* can be connected to an actuator 47, which is displaceable by a motor 49. The actuator 47 may be a mechanical actuator 47, but it is also possible to use a pneumatic/hydraulic actuator 47. The actuator 47 is preferably motorized and configured for automatic displacement based on information from the main control unit 13 or the peripheral control unit 43. For instance, the projection length d3 of the upper conveyor belts 36*a*, 36*b* may be determined from folding box dimensions entered into the user interface 40.

When the first and/or second distal outlet ends 62*a*, 62*b* of the upper conveyor 36 and the first and/or second distal outlet rollers 66*a*, 66*b* of the lower conveyor 38 change longitudinal position, the overall longitudinal contact length of the respective conveyor belt 36*a*, 36*b*; 38*a*, 38*b* changes. In order to accommodate for different longitudinal lengths with the same conveyor belt, the travel path P of the conveyor belts 36, 38 is changed. This can be achieved with adjustable compensation rollers 39*a*, 39*b* arranged in the fixed frame components 45*a*, 46*a*. The adjustable compensation rollers 39*a*, 39*b* may be linearly movable so as to modify the travel path P of the conveyor belts 36, 38. This makes it possible to position the distal outlet rollers 62*a*, 62*b*; 66*a*, 66*b* at different longitudinal positions while maintaining the distal inlet rollers 60*a*, 60*b*; 67*a*, 67*b* stationary.

The first and second lower conveyor belts 36*a*, 36*b* can be positioned around a first and second roller assembly 80*a*, 80*b* comprising a series of idle rollers positioned closely together. The roller assemblies 80*a*, 80*b* provide stable support surface to the batch of folding boxes and guides the lower conveyor belts 38*a*, 38*b*. A drive roller 82 is located in a lower frame structure 45 and may be provided with a transverse length such that it is in contact with and configured to drive both the first and second lower conveyor belts 38*a*, 38*b* in unison.

The distal outlet ends 66*a*, 66*b* of the first and second lower conveyor belts 38*a*, 38*b* may also be individually movable in the longitudinal direction D, which enables the lower conveyor belts 38*a*, 38*b* to be positioned at different longitudinal positions, and also in different longitudinal positions in relation to each other. The first and second lower conveyor belts 38*a*, 38*b* are thus provided with a variable projection length in the longitudinal direction D. This allows an adjustment according to the geometry of the back-trailing edge 5 of the folding boxes 2.

As previously described, and similar to the upper conveyor belts 36*a*. 36*b*, the length of the first and second lower conveyor belts 38*a*, 38*b* can also be modified by providing a first and a second longitudinally movable distal outlet rollers 65*a*, 65*b*. To this effect, the lower conveyor belts 38*a*, 38*b* are located in a lower frame 45, and connected to a movable frame component 45*b* which is slidably connected to a fixed frame component 45*a*.

As illustrated in the detailed view of FIG. 7, a first and second roller assembly 80*a*, 80*b* having a variable contact length with the first and second lower conveyor belts 38*a*, 38*b* can be provided. The roller assemblies comprise a series of rollers 82 mounted in a chain. The roller assemblies 80*a*, 80*b* are arranged within the loop of the endless conveyor belts 38*a*, 38*b* In such a way, there is no interference between the roller assemblies and the conveyor belts 38*a*, 38*b*. The roller assemblies 80*a*, 80*b* comprise a plurality of pin-shaped links 84 which are joined together in a plurality of pivoting axis 86. The rollers 82 are rotatably connected to a roller frame component 88 which is connected to the pivoting axis 86.

The roller assemblies 80*a*, 80*b* are connected to the movable frame component 45*b*, and as the movable frame component 45*b* is extended or retracted in the longitudinal direction D, the roller assemblies 80*a*, 80*b* follow the movement.

The transfer module 26 deposits the folding boxes 2 into the stacker module 28. As best seen in FIG. 4. the stacker module 28 comprises a loading surface 90, the front abutment guide 70 comprising a first 72*a* and a second front abutment surface 72*b*, and an ejector 76.

It is desirable to deposit the folding boxes 2 onto the loading surface 90 in the stacker module 28 such that they pre-form a calibrated stack of superposed boxes 2. The term "calibrated" means that the boxes are aligned by their edges and that the stack is provided with a consistent vertical height, such that the stack is straight. The conveyors 36, 38 of the transfer module 26 and the front abutment surfaces 72a, 72b are configured to contain the folding boxes 2 inside a restricted space. As the folding boxes 2 follow the direction of transportation D while being provided with a substantial kinetic energy, it is preferable to first align the folding boxes by their leading front edges 3 by using the first and second front abutment surfaces 72a, 72b as abutments. The abutment surfaces 72a, 72b function as stop surfaces, which prevent a further forward movement of the front leading edges 3.

The ejector 76 is arranged to evacuate the stack from the loading surface 90 in the stacker module 28 and further transport the stack into the banding unit 30. The ejector 76 is located behind the stack in the direction of transportation D and may further align the back trailing edges 5 of the folding boxes 2. To this effect, the ejector 76 comprises a vertical contact surface 78 with a vertical length exceeding a maximum height of the stack.

As best seen in FIG. 4, the distal outlet ends 66a, 66b of the first and second lower conveyor belts 38a, 38b may be vertically aligned with the vertical contact surface 78 of the ejector 76. This limits the distance between the ejector 76 and the back trailing edges 5 of the folded boxes 2. This also reduces the distance needed to for the ejector 76 to push the formed stack of folding boxes 2 into the banding unit 30. This alleviates a potential problem that longer the ejector 76 has to displace the stack, the more damage may be created on the back trailing edge 5 of the folding boxes 2 in the stack.

The first and second lower conveyor belts 38a, 38b in the transfer module 26 and the loading surface 90 in the stacker module 28 may be provided with an upwardly sloping surface S in the direction of transportation D. The transfer module 26 is therefore configured to direct the leading front edge 3 of the folding boxes 2 upwardly.

The transfer module 26 deposits the folding boxes 2 in the stacker module 28 such that their leading front edge 3 is touching the first and second front abutment surfaces 72a, 72b of the front abutment guide 70. The loading surface 90 can be provided with an upwardly sloping angle of 2 to 7°, preferably 5° which results in that the boxes 2 perform an additional backward movement in order to be aligned by their back trailing edge 5 against the vertical contact surface 78 of the ejector 76. This helps to calibrate the stack and ensures that the ejector 76 is in contact with the back trailing edges 5 of the folding boxes 2. The sloping angle in the transfer module 26 facilitates the positioning of the folding boxes 2 at a corresponding sloping angle of the loading surface 90 in the stacker module.

The loading surface 90 is configured to receive a batch or a series of batches of inverted and non-inverted boxes 2 and descend until a predefined number of boxes are loaded onto the loading surface 90. This predefined number will typically depend on the number of boxes 2 which should be contained in each bundle from the banding module 30.

Figure 11A:
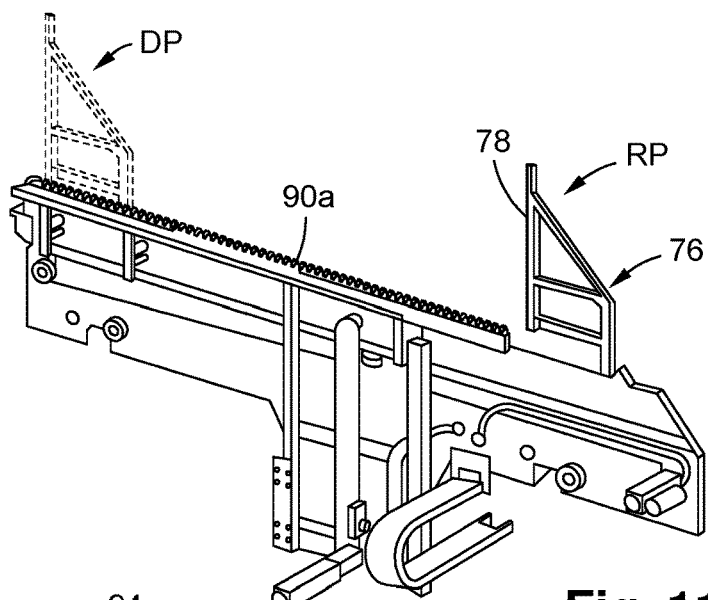
FIGS. 11a to 11c are schematic perspective views of a loading surface of a stacker module according to an embodiment of the present invention.
Figure 11B:
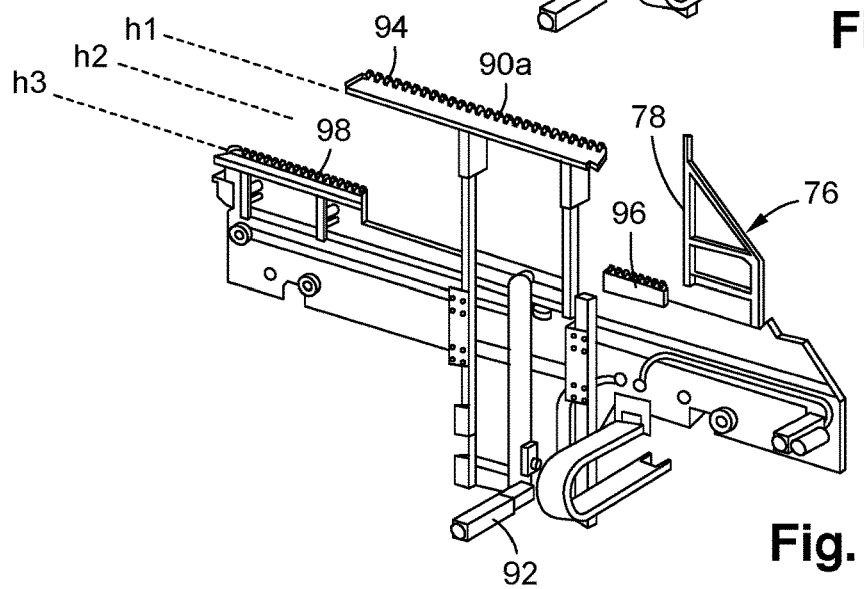

As best seen in FIG. 11b, the loading surface 90 is movable between an initial loading height h1 and an evacuation height h3. The initial loading height h1 and the evacuation height h3 may be fixed distances which can be modified and defined in the control system. However, as the number of desired boxes per bundle changes, a vertical evacuation distance between a final loading height h2 and the evacuation height h3 may be provided. Hence, an evacuation descent is defined between the heights h2 and h3. During this evacuation descent distance, no boxes are deposited onto the loading surface 90. The distance of the evacuation descent may be varied depending on different heights of stacks that are produced. This is a result of that the final loading height h2 may depend on the number of folding boxes 2 in the stack.

Figure 11C:
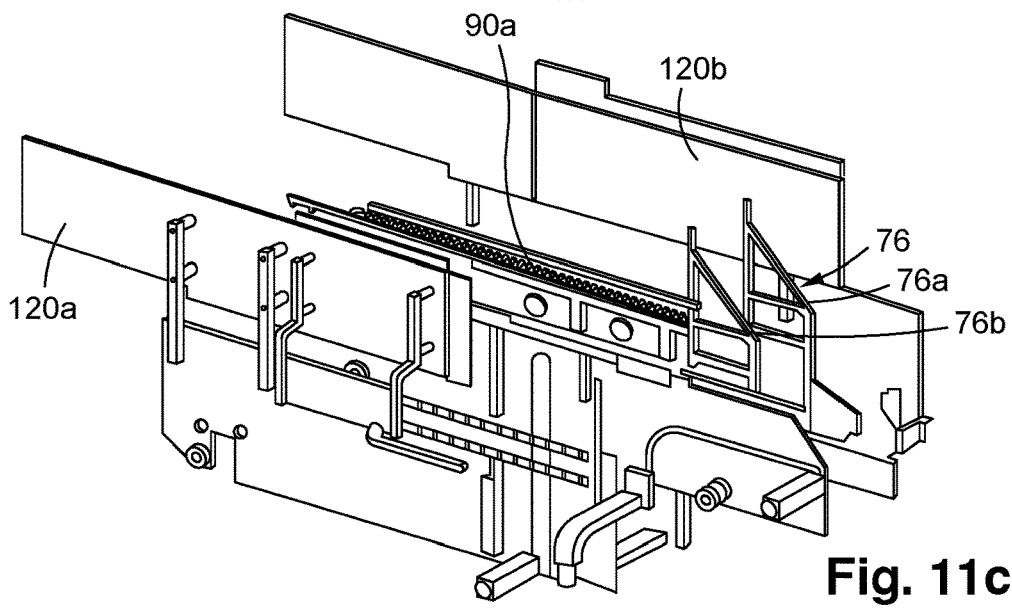
Figure 12A:
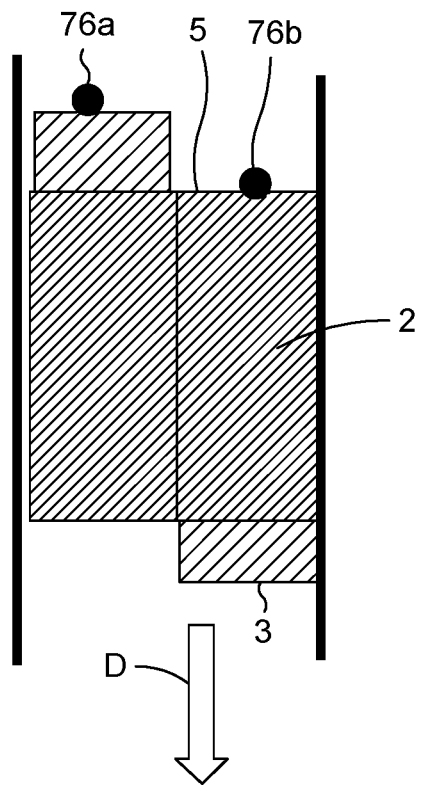
FIGS. 12a and 12b are schematic diagrams illustrating two exemplary position settings of an ejector according to an embodiment of the present invention having a displaceable first and second pusher.
Figure 12B:
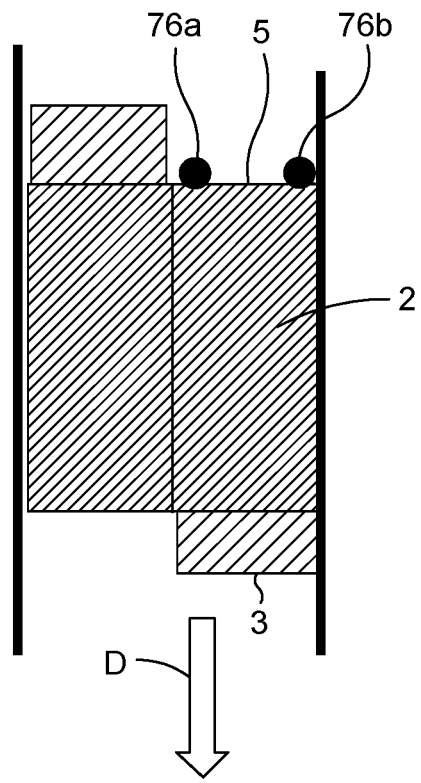

As illustrated in FIGS. 11a to 11c, the loading surface 90 is connected to a drive actuator 92 which is configured to apply a speed of descent of the loading surface 90. The speed can be set in relation to the speed of the upper and lower conveyors 36, 38 in the transfer module 26. The speed of the loading surface 90 during the ascent and/or descent can also be set to a maximum and regardless of the speed of the conveyors 36, 38.

In an embodiment, the loading surface 90 descends continuously. In another embodiment, the loading surface 90 may descend stepwise in a discontinuous manner. The stepwise and discontinuous descent can be set to comprise a series of predefined distances for each batch received onto the loading surface 90. This is advantageous as the loading surface 90 maintains stationary as the folding boxes 2 are deposited. Hence, potential friction and misalignments can be prevented.

The loading surface 90 may consist of two elongated and spaced apart support rails 90a, 90b. The rails 90a, 90b minimize the contact surface against the stack such that the friction can be reduced. Additionally, the loading surface 90 is light and can be easily moved up and down in the vertical direction.

The loading surface 90 enables a sliding movement of the stack towards the banding module 30 as the ejector 76 pushes against the back edge of the stack. In an embodiment, a low-friction surface such as Teflon can be used. Alternatively, and in an advantageous embodiment, the loading surface 90 may comprise rollers 94. The rollers 94 can be idle, as the force of movement for the transportation can be provided by the ejector 76. Alternatively, at least some of the rollers 94 can be motorized.

The loading surface 90 can be interposed between a back sliding surface 96 and a front sliding surface 98 in the form of roller-provided rails, whereby these sliding surfaces extend in the direction of transportation D. The back sliding surface 96 and the front sliding surface 98 may be stationary arranged. The back sliding surface 96 represents an extension of the loading surface 90 onto which a rear part the folding boxes 2 can be supported. The front sliding surface may advantageously be configured as a transition between the loading surface 90 and a downstream-located deposit surface 101 in the banding module 30.

The front and back sliding surfaces 96, 98 may be provided with a fixed height and are preferably aligned with a deposit surface in banding zone 100 of the banding module 30. The front sliding surface 98 also enables a longer travel distance such that the ejector 76 is able to push the stack out from the stacker module 28, whereby the stack can be discharged from the loading surface 90, then transported on the front sliding surface 98 and deposited in the banding zone 100. Hence, the loading surface 90 and the front sliding surface 98 enables the ejector 76 to position the stack directly into a location in the banding zone 100 where the bands are applied around the stack.

As best seen in FIG. 11a, the ejector 76 is linearly and reciprocally movable between a retracted position RP and an extended position DP. As illustrated in FIG. 4, the ejector 76 may be arranged such that at least a portion of the ejector 76 is positioned upstream of the distal outlet ends 66a, 66b of the first and second lower conveyor belts 38a, 38b.

As best seen in FIGS. 8, 11c 12a and 12b, the ejector 76 may comprise a first pusher 76a and a second pusher 76b, where the first pusher 76a and the second pusher 76b can be set into different longitudinal positions. Hence, the first pusher 76*a* can be positioned at a different longitudinal position than the second pusher 76*b*. This is advantageous for boxes 2 with a non-uniform trailing back edge, such that the first and second pushers 76*a*, 76*b* can be positioned corresponding to the geometry of the trailing back edge 5. Additionally, this gives a possibility to align the pushers 76*a*, 76*b* with the most rigid part of the folding boxes 2. The first and second pushers 76*a*, 76*b* can also be laterally adjustable. This enables the first and second pushers 76*a*, 76*b* to completely adapt to the size, length and overall geometry of the back trailing edge 5 of the folding box.

The pushers 76*a*, 76*b* comprise a linear vertical contact surface 78 which corresponds to or exceeds a maximal height of the stack. The vertical contact surface 78 is advantageously positioned such that it is aligned with the distal outlet ends 66*a*, 66*b* of the lower conveyor belts 38*a*, 38*b*. When the lower conveyor belts 38*a*, 38*b* of the transfer module 26 are displaced in the longitudinal direction D (to adjust for different sizes of folding boxes), the longitudinal position of the first and second pushers 76*a*, 76*b* can be set accordingly. The vertical contact surface 78 is limiting a backward movement of the stack.

Figure 13:
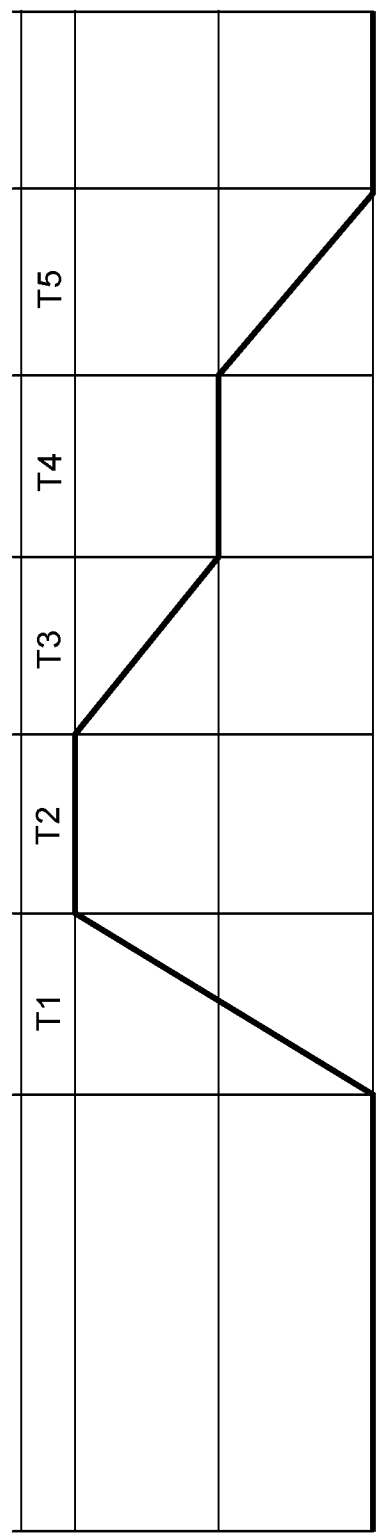
FIG. 13 is a schematic diagram illustrating a modulation of speed and acceleration of an ejector in an embodiment of the present invention.

As schematically illustrated in FIG. 13, the movement of the ejector 76 may be modulated such that its trajectory comprises a plurality of distances with different speeds and accelerations. This trajectory corresponds to a transportation distance of the formed stack from the loading surface 90 to the banding zone 100 in the banding module 30. Hence, the ejector 76 has a trajectory from an initial position behind the distal ends 66*a*, 66*b* of the lower conveyor belts 38*a*, 38*b* and may travel all the way to the banding zone 100 in its extended position DP. The banding module 30 may be provided with a central cut-out adapted to receive the ejector 76 when present in the banding module 30. During the banding process, when the stack is present in the banding module, the ejector speed and acceleration will be reduced to ensure precision for the banding and avoid marks on the folding boxes 2.

The speed and the acceleration have an impact on potential damage on the folding boxes 2 during the transition between the stacker module 28 and the banding module 30. At the same time, it is advantageous to provide a high and optimized speed of the ejector 76 such that the overall production speed of the conditioning section 20 can be maintained. It has been found advantageous to provide a varying speed and acceleration over a plurality of different segment distances.

The acceleration and decelerations in these pre-defined distance segments may be modified. As illustrated in the figure, the segment distances are:

T1—Acceleration distance
T2—Approaching zone to banding module
T3—Deceleration distance
T4—Insertion speed banding module
T5—Deceleration in banding module The first distance T1 over which a first acceleration is applied may depend the longitudinal length of the folding boxes 2. Folding boxes 2 with a shorter longitudinal length Lb1, Lb2 have to travel longer before reaching the banding zone 100 in the stacker. In the segment T2, once the optimal speed has been reached, the acceleration is null. As the ejector 76 approaches the banding zone 100, the speed is reduced by a deceleration. The insertion speed in the banding zone 100 is then constant in the segment T4 in order to ensure a controlled positioning of the bands around the stack. As the stack is ejected from the banding zone 100, a further deceleration can be applied in a distance segment T5 such that the banded stack can be carefully deposited at an outlet of the folder-gluer machine 1.

These distance segments T1 to T5 may be automatically defined by a program stored in a memory of the control circuitry of the conditioning section 20. The program may calculate the acceleration and speed depending on the format and paper/cardboard characteristics such as mechanical resistances. Optionally, the production mode which define the speeds and accelerations in different distance segments T1 to T5 is selectable on the control interface 40 on the folder-gluer machine 1.

Figure 8:
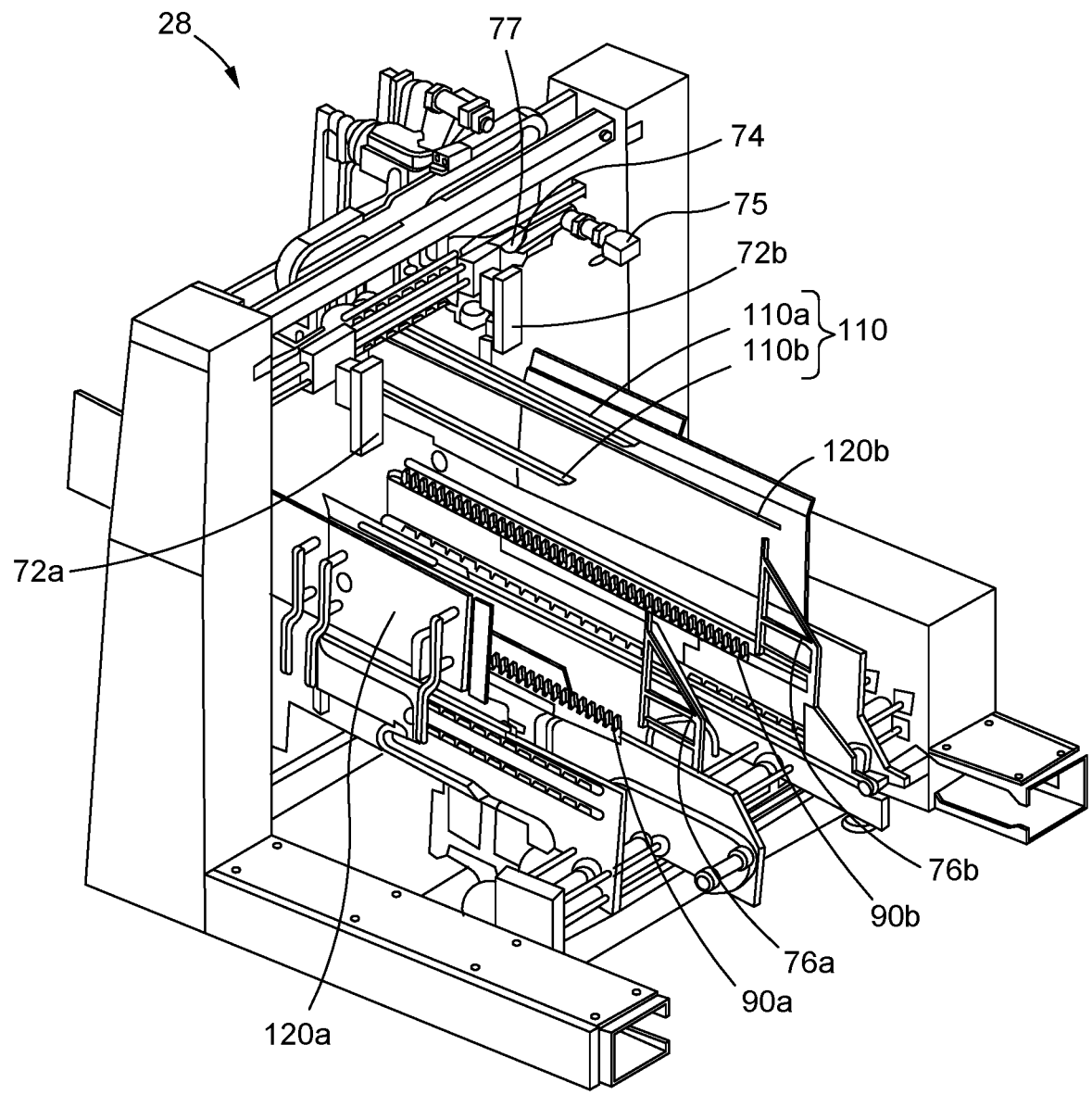
FIG. 8 is a schematic cross-sectional view of a stacker module according to the present invention.
Figure 9:
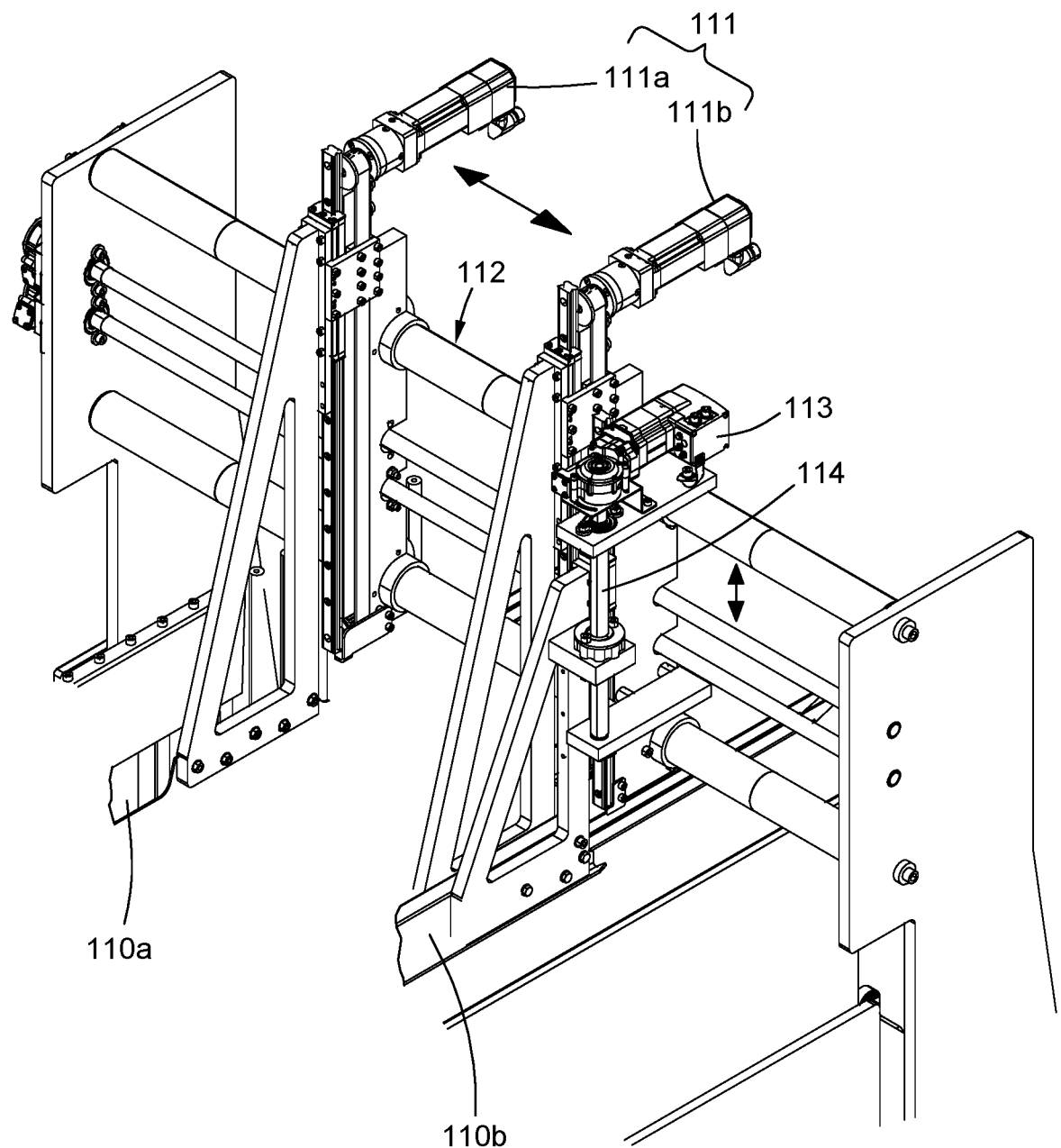
FIG. 9 is a detailed schematic perspective view of upper guides in a stacker module according to an embodiment of the present invention.
Figure 10:
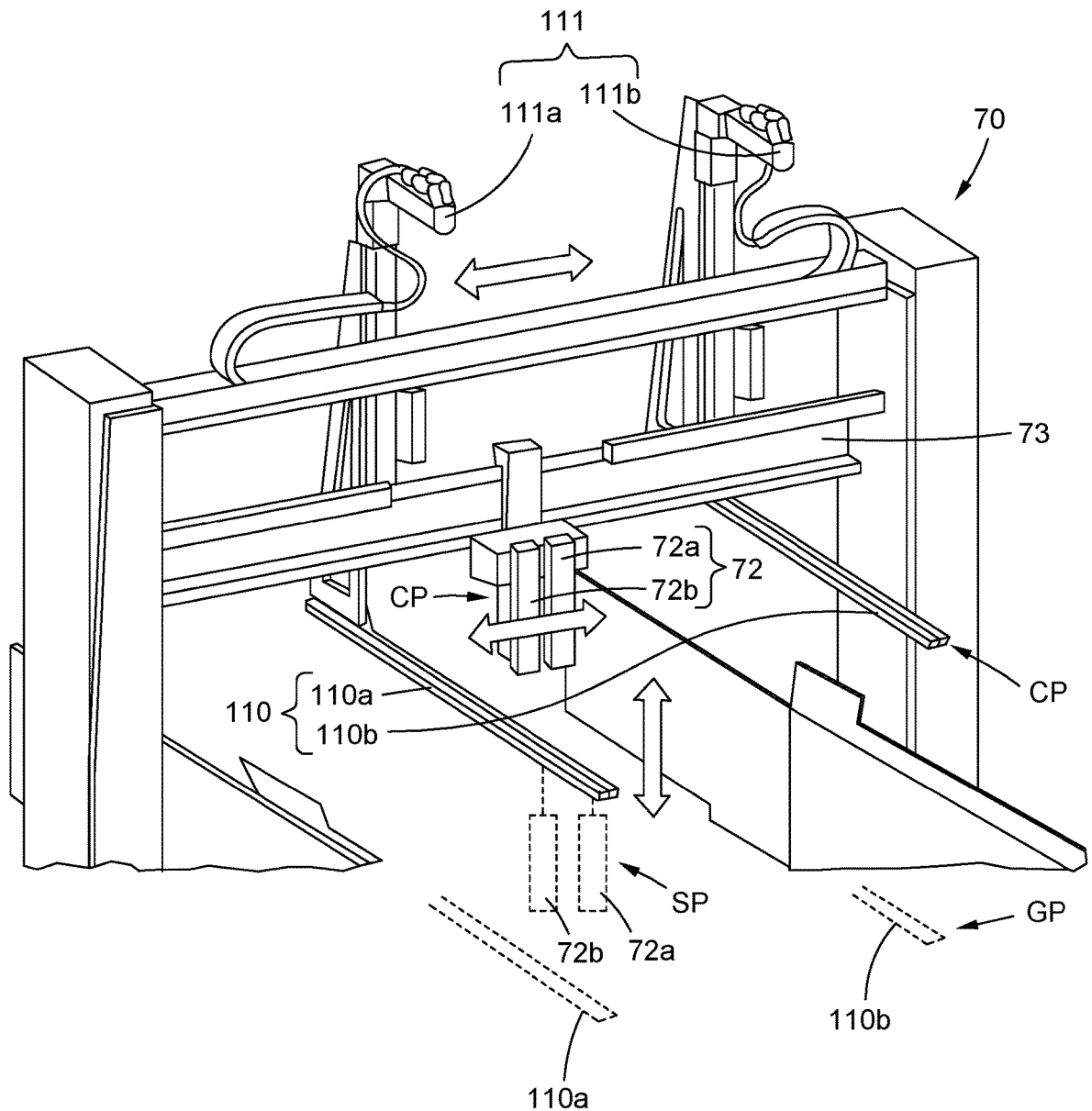
FIG. 10 is a detailed schematic perspective view of a front abutment guide in a stacker module according to an embodiment of the present invention.

As best seen in FIGS. 4, 8 and 10, the front abutment guide 70 is arranged in front of the loading surface 90 in the direction of transportation. As previously described, the front abutment guide 70 may comprise a first 72*a* and a second front abutment surface 72*b*.

The first 72*a* and a second front abutment surface 72*b* may be in the form of a first plate 72*a* and a second plate 72*b* movably attached to a transverse frame 73. The transverse frame extends in traverse or perpendicular to the longitudinal direction D of the folder-gluer machine 1.

Depending on the format of the folding boxes and especially of the transverse length of the front leading edge 3, the lateral distance between the first plate 72*a* and the second plate 72*b* can be adjusted. Typically, the longer the leading front edge 3 of the folding box 2, the larger the distance is between the first plate 72*a* and the second plate 72*b*. The front abutment surfaces 72*a*, 72*b* can also move in the longitudinal direction (i.e. direction of transportation D) of the folder-gluer machine 1. This further improves the support of leading front edges 3 which are not straight, as previously described. Hence, the first and second plate 72*a*, 72*b* can be set in different lateral and longitudinal positions which correspond to the geometry of the leading front edge 3 of the folding box 2.

As best seen in FIG. 8, the first plate 72*a* and the second plate 72*b* are connected to an actuator 74 and motor 75, and may be further be connected to a control unit 13, 43 of the folder-gluer machine 1. The control unit 43 may be a peripheral control unit for the conditioning section 20. The optimal position of the first and second plates 72*a*, 72*b* may be automatically calculated by the control unit 13, 43 in relation to the dimensions of the folding box 2 when folded.

A sensor 77, such as a linear encoder 77, can be placed on the front abutment guide actuator 74 and connected to the control unit 13, 43 and the motor 75. The sensor 77 can detect the positions of the first plate 72*a* and the second plate 72*b* and transmit detected positions to a memory 39. This enables the motor 75 to retrieve position feedback to control its movement and final position of the first and second abutment plates 72*a*, 72*b*. For a subsequent job with a folding box 2 of a different dimension, the actual positions of the first and the second plates 72*a*, 72*b* can be retrieved from the memory 39 and the actuator 74 and motor 75 can displace the first and second plates 72*a*, 72*b* to new optimal positions.

Additionally or alternatively, the first plate and the second plate 72*a*, 72*b* can be manually positioned. Either as a main setting, or manually displaced to be adjusted by the machine operator.

As schematically illustrated in FIGS. 3 and 10, the first and second plates 72*a*, 72*b* are vertically movable between an abutment position SP and a clearance position CP. In the abutment position SP, the plates 72*a*, 72*b* are positioned in their low position in order to abut against the leading front edge 3 of the folded boxes 2. In the clearance position CP, the plates 72a, 72b are positioned higher than in the support position SP such that the full stack and the vertical surface 78 of the ejector 76 can be displaced under the plates 72a, 72b without interference.

The up and down vertical reciprocating movement of the plates 72a, 72b is coordinated by the control unit 43 such that it is synchronized together with the displacement of the ejector 76. As previously described, the lateral distance between the first and second contact plates 72a, 72b can be modified, such as for different shapes of boxes. To this effect, a locomotive system for repeat order can be used for predefined formats and geometries of folding boxes 2 stored in a memory 39.

Figure 15:
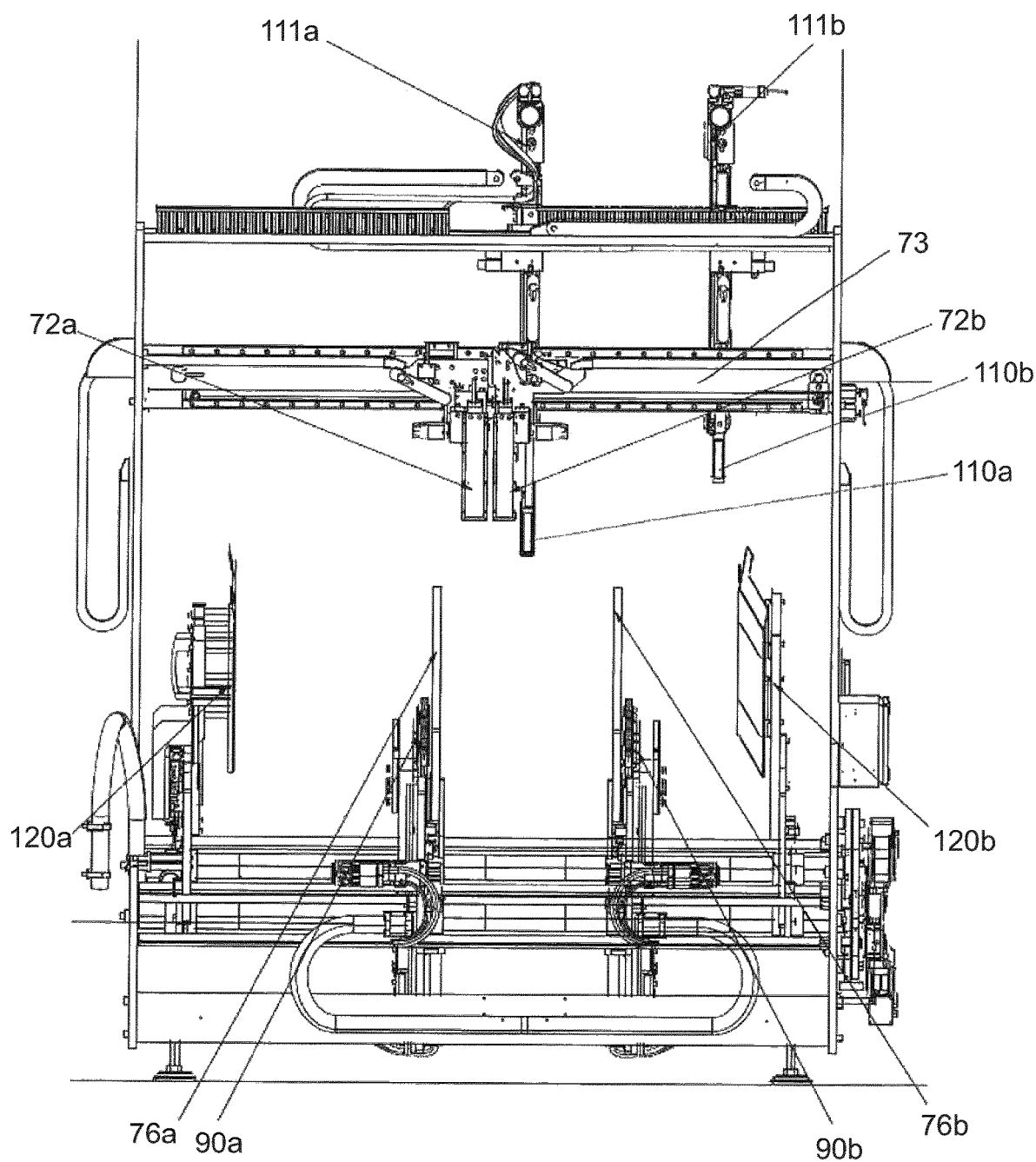
FIG. 15 is a schematic perspective view of a stacker module according to an embodiment of the present invention as seen in the direction of transportation.

As illustrated in FIGS. 10 and 15, the stacker module 28 may further comprise an upper guide 110, which is configured to guide the stack during transportation from the stacker module 28 to the banding module 30. The upper guide 110 prevents folding boxes 2 from moving upwardly during transportation to the banding module 30 and may also calibrate or compress the height of the stack.

The upper guide 110 is vertically movable between a clearing position CP and a guiding position GP. Once the stack is ready to be ejected from the stacker module 28 and be moved into the banding module 30, the upper guide 110 is descended from the clearing position CP to the guiding position GP in order to be positioned in close proximity with the top surface of the stack. The upper guide 110 may be dynamically arranged such that it can be set according to the height of the stack.

The upper guide 110 also helps to avoid a "pile spring effect" by keeping the stack calibrated to ensure the transition to the banding module 30.

Additionally, in an advantageous embodiment, the upper guide 110 may be further configured to abut against the upper surface of the stack as the stack descends from a final loading height h2 to an evacuation height h3 (see FIG. 11b). The final loading height h2 corresponds to the height of the loading surface 90 when the number of folding boxes 2 to be included in a bundle are deposited thereupon. The upper guide 110 can, by following the downward movement of the loading surface 90, maintain the stack calibrated during the descent. Additionally, as the upper guide 110 may be programmed to be positioned at a predefined distance in relation to the loading surface 90 such that stack can be calibrated to be compressed to a predefined height.

The upper guide 110 may comprise a first guide member 110a and a second guide member 110b. The guide members 110a, 110b can be in the shape of elongated bars or blades. The guide members 110a, 110b have a longitudinal extension between the outlet 58 of the transfer module 26 and a deposit surface 101 in the banding module 30. The first guide member 110a and the second guide member 110b can be laterally displaceable in a direction transverse or perpendicular to the direction of transportation D.

The lateral displacement can be effectuated by a guide motor 111, or a pair of guide motors 111a, 11b and an actuator 112. The lateral displacement makes it possible to laterally off-set the upper guide members 110a, 110b in relation to the upper and lower conveyor belts 36a, 36b; 38a, 38b in the transfer module 26. This reduces potential interference between these elongated parts. Additionally, the lateral adjustment enables a better adjustment to different widths of the folding boxes 2, so that the first and second guide members 110a, 110b can be adapted to different widths of boxes 2. The vertical displacement of the guide members 110a, 110b can be provided by a guide descent motor 113 and actuator 114, which can be arranged to move the first and second guide members 110a, 110b in unison between the initial loading height h1 and the evacuation height h3.

As best seen in FIGS. 8 and 11, the stacker module 28 may further comprise a first and second lateral side guide 120a, 120b. The lateral side guides 120a, 120b may have an upper inclined surface to form a receiving funnel in the in perpendicular in relation to the direction of transportation D such that the lateral sides of the folding boxes 2 in the folder-gluer machine 1 are aligned when positioned on the loading surface 90. Additionally, vertical walls can be arranged vertically below the first and second lateral side guides 120a, 120b. The walls retain the stack laterally when transported to the banding unit 28 and are particularly useful for long folding boxes 2. In an embodiment, the walls can be transparent to allow the operator to visually monitor the stack alignment before the banding module.

The skilled person will realize that the present invention by no means is limited to the described exemplary embodiments. While the invention has been illustrated in detail in the drawings and in the foregoing description, such illustration and description is considered to be illustrative or exemplary and not restrictive; the invention is not limited to the disclosed embodiments.

The invention claimed is:

1. A transfer module for a folder-gluer machine, the transfer module comprising a lower conveyor and an upper conveyor adapted to receive a folding box therebetween and to transport the folding box in a direction of transportation towards a downstream-located loading surface in a stacker module,
   wherein the upper conveyor of the transfer module extends further in the direction of transportation than the lower conveyor,
   wherein the lower conveyor comprises a first lower conveyor belt and a second lower conveyor belt, each having a lower inlet end and a lower outlet end, and wherein the lower outlet ends are displaceable in the direction of transportation,
   wherein the upper conveyor comprises an upper inlet end defined by an inlet roller and an upper outlet end defined by an outlet roller, and wherein the inlet roller is vertically moveable between a first receiving position and a second transport position while the upper outlet roller remains in a same position.

2. The transfer module according to claim 1, wherein the lower outlet ends are individually displaceable at different longitudinal positions in the direction of transportation relative to the respective lower inlet ends.

3. The transfer module according to claim 1, wherein the upper conveyor comprises a first upper conveyor belt and a second upper conveyor belt, each provided with an upper distal inlet end and an upper distal outlet end, and
   wherein the upper distal outlet end of the first upper conveyor belt and the upper distal outlet end of the second upper conveyor belt are individually displaceable in the direction of transportation relative to a respective one of the upper inlet end of the first upper conveyor belt and the upper inlet end of the second upper conveyor belt, such that a projection of the upper distal outlet end of the first and second upper conveyor belts in the direction of transportation is variable.

4. The transfer module according to claim 3, wherein the upper distal outlet end of the first upper conveyor belt and the upper distal outlet of the second upper conveyor belt are positioned at different longitudinal positions in relation to each other.

5. The transfer module according to claim 3, wherein the first upper conveyor belt and the second upper conveyor belt are arranged parallel to each other.

6. The transfer module according to claim 3, wherein each of the first and second upper conveyor belts are mounted on an upper frame portion having an upper fixed frame portion and an upper movable frame portion, wherein the upper movable frame portion comprises a first upper distal outlet roller and a second upper distal outlet roller defining the upper distal outlet ends of the first and second upper conveyor belts.

7. The transfer module according to claim 6, wherein each of the first and second lower conveyor belts are mounted on a lower frame portion having a lower fixed frame portion and a lower movable frame portion, wherein the lower movable frame portion comprises a lower distal roller defining the lower outlet ends of the first and second lower conveyor belts.

8. The transfer module according to claim 7, wherein a lower first roller assembly and a lower second roller assembly are connected to the lower movable frame portion and configured to follow its movement.

9. The transfer module according to claim 1, wherein the first and second lower conveyor belts and the first and second upper conveyor belts are laterally movable such that a lateral distance between the first and second lower conveyor belts and the first and second upper conveyor belts is modified.

10. The transfer module according to claim 7, wherein the first and second lower conveyor belts and the first and second upper conveyor belts are guided by displaceable compensation rollers movable relative to the fixed frame portion and located in the lower fixed frame portion and the upper fixed frame portion, and wherein the displaceable compensation rollers are configured to change a travel path of the first and second lower conveyor belts and the first and second upper conveyor belts and modify their contact length against the folding box.

11. The transfer module according to claim 1, wherein a support surface in the transfer module is located between the upper and lower conveyors and wherein said support surface is upwardly sloped in the direction of transportation at an angle ranging from 10 to 150.

12. A transfer and stacking assembly for a folder-gluer machine, the transfer and stacking assembly comprising the transfer module according to claim 5 and a stacker module, wherein the stacker module comprises a loading surface and an ejector, and wherein the loading surface is upwardly sloped in the direction of transportation.

13. A transfer and stacking assembly according to claim 12, wherein a support surface in the transfer module and the loading surface in the stacker module have substantially a same inclination.

14. The transfer and stacking assembly according to claim 12, wherein at least a portion of the ejector is positioned upstream of the lower outlet ends of the first and second lower conveyor belts.

15. A transfer module for a folder-gluer machine, the transfer module comprising a lower conveyor and an upper conveyor adapted to receive a folding box therebetween and to transport the folding box in a direction of transportation towards a downstream-located loading surface in a stacker module, wherein the upper conveyor of the transfer module extends further in the direction of transportation than the lower conveyor,
wherein the lower conveyor comprises a first lower conveyor belt and a second lower conveyor belt, each having a lower inlet end and a lower outlet end, and wherein the lower outlet ends are displaceable in the direction of transportation, and
wherein the upper conveyor comprises a first upper conveyor belt and a second upper conveyor belt, each having an upper inlet end defined by an inlet roller and an upper outlet end defined by an outlet roller, and wherein each upper inlet end is vertically displaceable between a first receiving position and a second transport position while each of the upper outlet rollers remains in a same position.

16. The transfer module of claim 15, wherein the lower outlet ends are individually displaceable in the direction of transportation relative to the respective lower inlet ends, and wherein the upper outlet ends are individually displaceable in the direction of transportation relative to the respective upper inlet ends.

17. The transfer module of claim 16, wherein a distance in the direction of transportation between each upper outlet end and the respective lower outlet end is variable.

18. The transfer module of claim 17, wherein the distance between the upper outlet ends and the lower outlet ends corresponds to a length of the folding box.

19. The transfer module of claim 15, wherein each of the first upper conveyor belt and the second upper conveyor belt is mounted on an upper frame portion having an upper fixed frame portion and an upper movable frame portion, wherein the upper movable frame portion comprises a first upper distal outlet roller and a second upper distal outlet roller defining the upper outlet ends of the first and second upper conveyor belts.

20. The transfer module of claim 19, wherein each of the first lower conveyor belt and the second lower conveyor belt is mounted on a lower frame portion having a lower fixed frame portion and a lower movable frame portion, wherein the lower movable frame portion comprises a lower distal roller defining the lower outlet ends of the first and second lower conveyor belts.

* * * * *

UNITED STATES PATENT AND TRADEMARK OFFICE
CERTIFICATE OF CORRECTION

PATENT NO. : 12,325,606 B2
APPLICATION NO. : 18/040285
DATED : June 10, 2025
INVENTOR(S) : Olivier Favre et al.

Page 1 of 1

It is certified that error appears in the above-identified patent and that said Letters Patent is hereby corrected as shown below:

In the Claims

In Claim 11, Column 17, Line 43, delete "10 to 150." and insert --1° to 15°.--.

Signed and Sealed this
Twelfth Day of August, 2025

Coke Morgan Stewart
*Acting Director of the United States Patent and Trademark Office*